United States Patent
Toyooka et al.

(10) Patent No.: US 11,891,001 B2
(45) Date of Patent: Feb. 6, 2024

(54) VEHICLE POWER SUPPLY SYSTEM

(71) Applicant: HONDA MOTOR CO., LTD., Tokyo (JP)

(72) Inventors: Kazuki Toyooka, Tokyo (JP); Yuhei Matsuo, Tokyo (JP); Hayahito Ukai, Tokyo (JP); Yasuhiro Ikeda, Tokyo (JP); Hironori Deno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 17/861,678

(22) Filed: Jul. 11, 2022

(65) Prior Publication Data
US 2023/0011332 A1    Jan. 12, 2023

(30) Foreign Application Priority Data

Jul. 12, 2021    (JP) .................... 2021-115173

(51) Int. Cl.
*B60R 16/033*    (2006.01)
*B60L 3/00*    (2019.01)
(Continued)

(52) U.S. Cl.
CPC .......... *B60R 16/033* (2013.01); *B60L 3/0023* (2013.01); *B60L 50/60* (2019.02); *H02J 9/061* (2013.01); *B60L 2210/10* (2013.01)

(58) Field of Classification Search
CPC ....... H02J 9/061; H02J 7/0029; B60R 16/033; B60L 58/18; B60L 3/0092
See application file for complete search history.

(56) References Cited

U.S. PATENT DOCUMENTS

| 7,525,286 B2 * | 4/2009 | Wang ................. H02J 1/14 |
| | | 320/105 |
| 11,133,702 B2 * | 9/2021 | Izawa ................. B60L 3/04 |

(Continued)

FOREIGN PATENT DOCUMENTS

| JP | 2000-137062 A | 5/2000 |
| JP | 2007-064874 A | 3/2007 |

(Continued)

OTHER PUBLICATIONS

May 9, 2023, Translation of Japanese Office Action issued for related JP Application No. 2021-115173.

*Primary Examiner* — Daniel Kessie
*Assistant Examiner* — Terrence R Willoughby
(74) *Attorney, Agent, or Firm* — Paratus Law Group, PLLC

(57) ABSTRACT

A vehicle power supply system, being mounted on a vehicle, includes: a main power supply system including a main low-voltage power supply and a normal load; and a backup power supply system including a backup low-voltage power supply and an emergency important load and connected to the main power supply system. A backup power supply control device of the backup power supply system is configured to execute a backup low-voltage power supply state estimation processing, and output a signal indicating that the backup low-voltage power supply is in a state allowing supplying electric power for operating the emergency important load based on an estimation result of the backup low-voltage power supply state estimation processing, in a case in which the state of the vehicle does not satisfy a predetermined condition.

6 Claims, 9 Drawing Sheets

(51) Int. Cl.
*H02J 9/06* (2006.01)
*B60L 50/60* (2019.01)

(56) References Cited

U.S. PATENT DOCUMENTS

| | | | |
|---|---|---|---|
| 11,721,998 B2* | 8/2023 | Oonishi | H02J 9/04 |
| | | | 307/66 |
| 2014/0214251 A1 | 7/2014 | Sugiyama | |
| 2017/0349048 A1 | 12/2017 | Nakayama et al. | |
| 2018/0259585 A1 | 9/2018 | Shiraishi | |
| 2020/0189414 A1 | 6/2020 | Morita | |
| 2020/0238832 A1 | 7/2020 | Nakayama et al. | |
| 2022/0041059 A1 | 2/2022 | Nakayama et al. | |
| 2022/0158480 A1* | 5/2022 | Sasahara | H02J 7/007182 |
| 2022/0200311 A1* | 6/2022 | Oonishi | H02J 9/061 |

FOREIGN PATENT DOCUMENTS

| | | |
|---|---|---|
| JP | 2014-143868 A | 8/2014 |
| JP | 2016-103935 A | 6/2016 |
| JP | 2017-218013 A | 12/2017 |
| JP | 2018-146416 A | 9/2018 |
| WO | WO 2018/070314 A1 | 4/2018 |

* cited by examiner

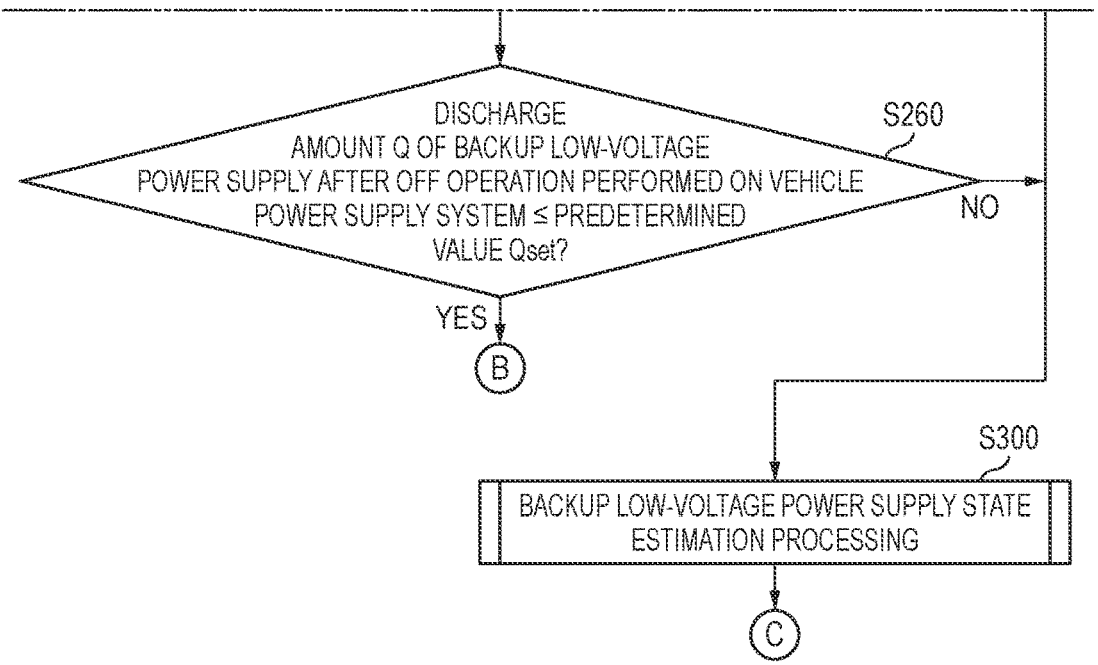

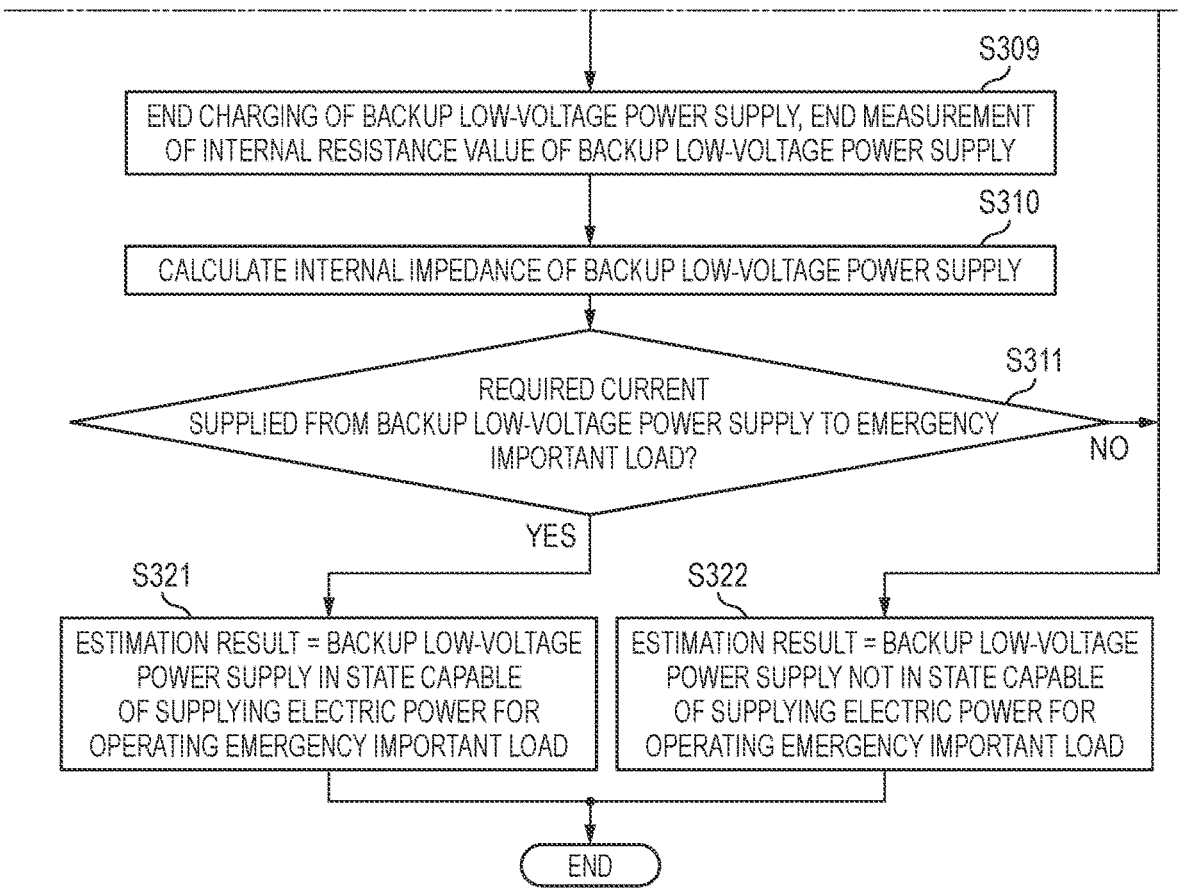

VEHICLE POWER SUPPLY SYSTEM

CROSS-REFERENCE TO RELATED APPLICATIONS

The present application claims the benefit of priority of Japanese Patent Application No. 2021-115173, filed on Jul. 12, 2021, the content of which is incorporated herein by reference.

TECHNICAL FIELD

The present invention relates to a vehicle power supply system to be mounted on a vehicle.

BACKGROUND ART

In recent years, there has been a need to improve traffic safety in order to make cities and human settlements inclusive, safe, resilient and sustainable. From the viewpoint of improving the traffic safety, in vehicles, for example, it is required to ensure the traffic safety even when an abnormality occurs in the vehicle, for example.

Therefore, a vehicle power supply system is known in which, when an abnormality occurs in a main power supply, by supplying electric power from a backup power supply to a specific important load, it is possible to continue supply of electric power to the specific important load, and it is possible to ensure traffic safety even when an abnormality occurs in the main power supply (for example, see JP-A-2017-218013).

In the vehicle power supply system according to JP-A-2017-218013, in order to reliably supply the electric power from the backup power supply to the specific important load when an abnormality occurs in the main power supply, it is preferable to estimate or detect in advance whether the backup power supply is in a state of supplying the electric power to the specific important load. As one of methods of estimating or detecting in advance whether the backup power supply is in a state of supplying electric power to the specific important load, there is a method of calculating an internal impedance of the backup power supply, and in order to calculate the internal impedance of the backup power supply with desired accuracy, it is necessary to measure an internal resistance value of the backup power supply for a predetermined time (for example, about 5 minutes to 10 minutes).

In this case, an estimation result or a detection result of whether the backup power supply is in a state of supplying electric power to the specific important load is not output during a period from transition of the vehicle power supply system from an OFF state to an ON state until an estimation processing or a detection processing of whether the backup power supply is in a state of supplying electric power to the specific important load is completed. Therefore, for example, in a vehicle capable of autonomous driving, there is a problem that it is not possible to determine whether autonomous driving is possible and autonomous driving cannot be executed during the period from the transition of the vehicle power supply system from the OFF state to the ON state until the estimation processing or the detection processing of whether the backup power supply is in a state of supplying electric power to the specific important load is completed.

SUMMARY

The present invention provides a vehicle power supply system capable of, when a state of a vehicle satisfies a predetermined condition, outputting a signal indicating that a backup low-voltage power supply is in a state capable of supplying electric power for operating an emergency important load in a short time after the vehicle power supply system transitions from an OFF state to an ON state.

According to an aspect of the present invention, there is provided a vehicle power supply system being mounted on a vehicle, the vehicle power supply system including: a main power supply system including a main low-voltage power supply and a normal load; and a backup power supply system including a backup low-voltage power supply and an emergency important load and connected to the main power supply system, where: the backup power supply system is configured to supply electric power of the backup low-voltage power supply to the main power supply system; the backup power supply system includes: a switching device configured to switch connection and cut-off with the main power supply system; and a backup power supply control device that controls the switching device; the backup power supply control device is configured to: execute a backup low-voltage power supply state estimation processing of estimating whether the backup low-voltage power supply is in a state allowing supplying electric power for operating the emergency important load when the vehicle power supply system transitions from an OFF state to an ON state; output a signal indicating whether the backup low-voltage power supply is in a state allowing supplying electric power for operating the emergency important load; output a signal indicating that the backup low-voltage power supply is in a state allowing supplying electric power for operating the emergency important load, without executing the backup low-voltage power supply state estimation processing, in a case in which a state of the vehicle satisfies a predetermined condition; and execute the backup low-voltage power supply state estimation processing, and output a signal indicating that the backup low-voltage power supply is in a state allowing supplying electric power for operating the emergency important load based on an estimation result of the backup low-voltage power supply state estimation processing, in a case in which the state of the vehicle does not satisfy the predetermined condition.

According to the present invention, when the state of the vehicle satisfies the predetermined condition, a signal indicating that the backup low-voltage power supply is in a state capable of supplying electric power for operating the emergency important load can be output in a short time after the vehicle power supply system transitions from the OFF state to the ON state.

DESCRIPTION OF EMBODIMENTS

Hereinafter, an embodiment of a vehicle power supply system according to the present invention will be described with reference to the accompanying drawings.

[Overall Configuration of Vehicle Power Supply System]

Figure 1:
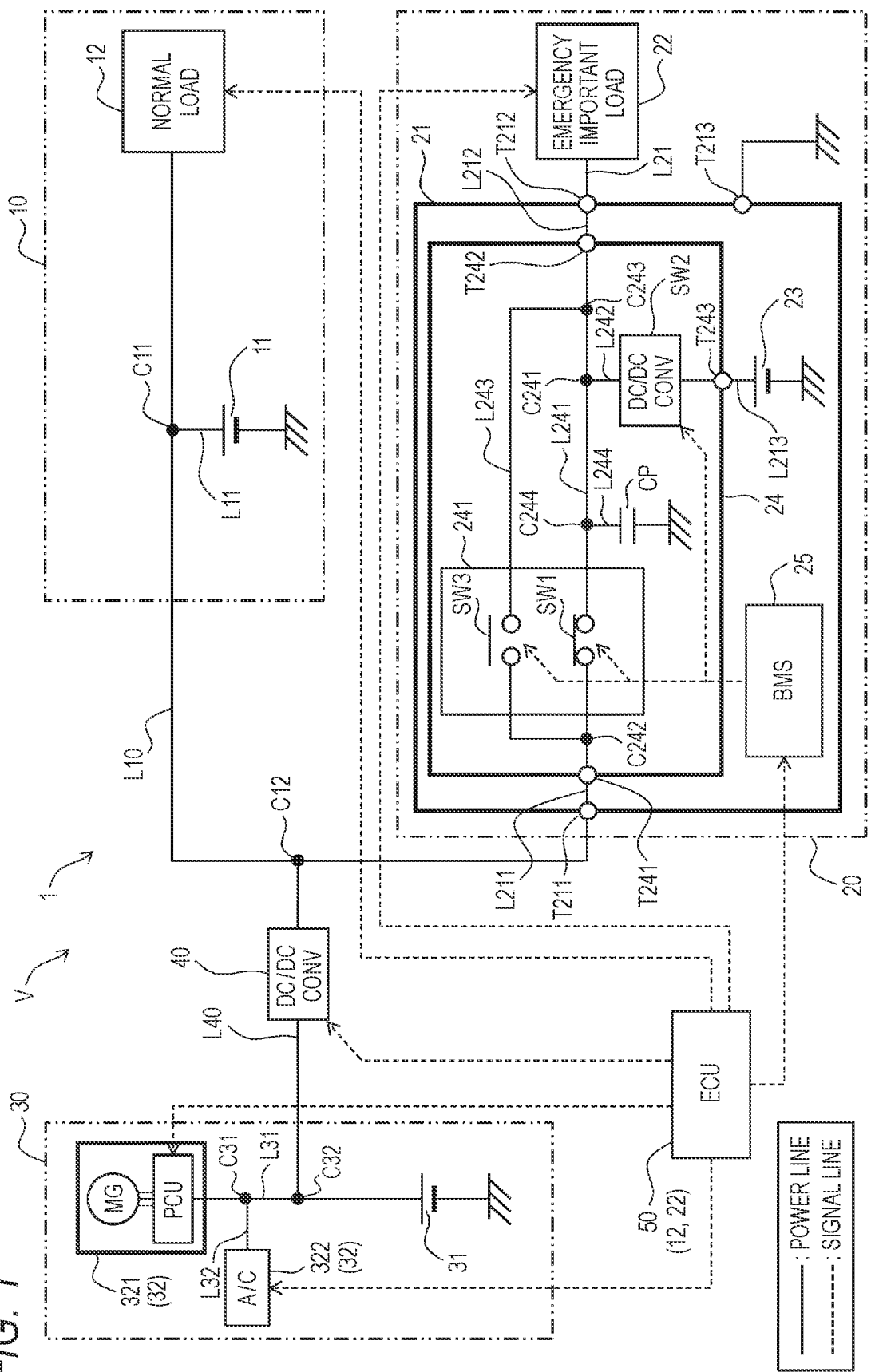
FIG. 1 is a schematic configuration diagram of a vehicle power supply system according to an embodiment of the present invention.

As shown in FIG. 1, a vehicle power supply system 1 of a vehicle V according to the present embodiment includes a main power supply system 10, a backup power supply system 20 connected to the main power supply system 10, a high-voltage power supply system 30, and a step-down device 40. The high-voltage power supply system 30 is connected to the main power supply system 10 and the backup power supply system 20 via the step-down device 40. The step-down device 40 steps down electric power flowing through the high-voltage power supply system 30. The step-down device 40 is, for example, a DC-DC converter.

The vehicle V on which the vehicle power supply system 1 is mounted is mounted with a drive unit 321 including a rotary electric machine MG to be described later, and a high-voltage power supply 31 that supplies electric power for driving the drive unit 321. Then, the vehicle V is a vehicle that can be driven by power of the rotary electric machine MG that is driven by the electric power of the high-voltage power supply 31. The vehicle V may be mounted with an internal combustion engine. The internal combustion engine may function as a power source that drives the vehicle V, or may function as a power source that drives a generator (not shown). That is, the vehicle V may be an electric vehicle that does not include an internal combustion engine, or may be a hybrid vehicle that includes an internal combustion engine and the rotary electric machine MG for driving the vehicle. The vehicle V is, for example, a vehicle capable of autonomous driving.

<Main Power Supply System>

The main power supply system 10 includes a main low-voltage power supply 11 and a normal load 12.

The main low-voltage power supply 11 is, for example, a secondary battery such as a lead battery. The main low-voltage power supply 11 outputs electric power having a voltage of, for example, 12 V The main low-voltage power supply 11 is provided on a connection line L11. One end portion of the connection line L11 is connected to a contact C11 formed on a connection line L10, and the other end portion of the connection line L11 is connected to a ground line having a reference potential of the vehicle power supply system 1. A positive electrode side of the main low-voltage power supply 11 is connected to a contact C11 side of the connection line L11, and a negative electrode side of the main low-voltage power supply 11 is connected to a ground line side of the connection line L11.

The normal load 12 includes a load having a function related to a traveling operation, a stopping operation, or drive control of the vehicle V. The normal load 12 includes an electronic control unit (ECU) 50 capable of executing the drive control of the vehicle V. Further, the normal load 12 may include at least one of an auxiliary load used for braking the vehicle V, such as an automatic brake device, an auxiliary load used for steering the vehicle V, such as an automatic steering device, an auxiliary load used for acquiring external information of the vehicle V, such as light detection and ranging (LiDAR), a wiper device, a power window device, and instruments.

The normal load 12 is connected to one end portion of the connection line L10.

<Backup Power Supply System>

The backup power supply system 20 includes a backup power supply unit 21 and an emergency important load 22.

The backup power supply unit 21 includes a backup low-voltage power supply 23, a switching device 24, and a backup power supply control device 25 that controls the switching device 24.

The backup power supply unit 21 includes a first external connection terminal T211, a second external connection terminal T212, and a ground terminal T213. The other end portion of the connection line L10 is connected to the first external connection terminal T211. The ground terminal T213 is connected to a ground line.

The emergency important load 22 includes a load having a function related to a traveling operation, a stopping operation, or drive control of the vehicle V. The emergency important load 22 is a load having a function related to execution of minimal risk maneuver (MRM), which is a minimum necessary traveling operation, stopping operation, or drive control for safely moving the vehicle V to a road shoulder of a road and stopping the vehicle V even when a drive force of a drive source is lost. The emergency important load 22 includes the above-described ECU 50 capable of executing the drive control of the vehicle V. The emergency important load 22 may further include at least one of an auxiliary load used for braking the vehicle V, such as an automatic brake device, an auxiliary load used for steering the vehicle V, such as an automatic steering device, and an auxiliary load used for acquiring the external information of the vehicle V, such as light detection and ranging (LiDAR).

The emergency important load 22 may overlap with the normal load 12 of the main power supply system 10. That is, a part of the normal load 12 of the main power supply system 10 may also serve as the emergency important load 22. Thus, the emergency important load 22 can be made redundant. In other words, the emergency important load 22 overlapping with the normal load 12 of the main power supply system 10 can also be operated by the main power supply system 10 and can also be operated by the backup power supply system 20. Accordingly, the emergency important load 22 overlapping with the normal load 12 of the main power supply system 10 can be operated even when an abnormality occurs in the main power supply system 10 and can be operated even when an abnormality occurs in the backup power supply system 20.

The emergency important load 22 is connected to the second external connection terminal T212 of the backup power supply unit 21 by a connection line L21.

The switching device 24 includes a first terminal T241, a second terminal T242, and a third terminal T243. The first terminal T241 is connected to the first external connection terminal T211 of the backup power supply unit 21 by a connection line L211. The second terminal T242 is connected to the second external connection terminal T212 of the backup power supply unit 21 by a connection line L212.

The switching device 24 includes a connection line L241 that connects the first terminal T241 and the second terminal T242. The connection line L241 is provided with a first switch SW1. In the present embodiment, the first switch SW1 is a switch having a normally open (NO) contact. The normally open contact is a contact that maintains the first switch SW1 in an OFF state and maintains the connection line L241 in a cut-off state when an operation signal is not applied to the first switch SW1. Specifically, in the case of an electromagnetic switch (for example, an electromagnetic contactor or an electromagnetic switch) in which an operation force is an electromagnetic force, when the electromagnetic force due to an operation current is not generated, the first switch SW1 is maintained in the OFF state and the connection line L241 is maintained in the cut-off state. The first switch SW1 is, for example, a semiconductor switch.

The switching device 24 includes a connection line L242 that connects the connection line L241 and the third terminal T243. One end portion of the connection line L242 is connected to the connection line L241 at a contact C241 formed between the first switch SW1 and the second terminal T242 on the connection line L241, and the other end portion of the connection line L242 is connected to the third terminal T243. The connection line L242 is provided with a second switch SW2. In the present embodiment, the second switch SW2 is a DC-DC converter. The second switch SW2 maintains the connection line L242 in a connected state when the second switch SW2 is in an ON state, and maintains the connection line L242 in a cut-off state when the second switch SW2 is in an OFF state. Further, since the second switch SW2 is a DC-DC converter, a voltage of electric power flowing through the connection line L242 can be stepped up or stepped down when the second switch SW2 is in the ON state. Thus, the second switch SW2 can switch the connection line L242 between the connected state and the cut-off state, and can step up or step down the voltage of the electric power flowing through the connection line L242 when the connection line L242 is in the connected state.

The switching device 24 includes a connection line L243 connected in parallel with the connection line L241. One end portion of the connection line L243 is connected to a contact C242 formed between the first terminal 7241 and the first switch SW1 on the connection line L241, and the other end portion of the connection line L243 is connected to a contact C243 formed between the contact C241 and the second terminal T242 on the connection line L241. The connection line L243 is provided with a third switch SW3. In the present embodiment, the third switch SW3 is a switch having a normally closed (NC) contact. The normally closed contact is a contact that maintains the third switch SW3 in an ON state and maintains the connection line L243 in a connected state when an operation signal is not applied to the third switch SW3. Specifically, in the case of an electromagnetic switch (for example, an electromagnetic contactor or an electromagnetic switch) in which an operation force is an electromagnetic force, when the electromagnetic force due to an operation current is not generated, the third switch SW3 is maintained in the ON state and the connection line L243 is maintained in the connected state. The third switch SW3 is, for example, a semiconductor switch.

Thus, in the backup power supply system 20, the first switch SW1 having a normally open contact and the third switch SW3 having a normally closed contact are provided in parallel.

When at least one of the first switch SW1 and the third switch SW3 is in the ON state, the backup power supply system 20 is connected to the main power supply system 10, electric power of the backup low-voltage power supply 23 can be supplied to the main power supply system 10, and electric power can be supplied from the main power supply system 10 to the emergency important load 22. On the other hand, when both the first switch SW1 and the third switch SW3 are in the OFF state, connection between the backup power supply system 20 and the main power supply system 10 is cut off.

Therefore, even when electric power is not supplied to the backup power supply control device 25, the electric power can be supplied from the main power supply system 10 to the emergency important load 22.

In the present embodiment, the first switch SW1 and the third switch SW3 are modularized as a switch module 241.

The switching device 24 includes a connection line L244 that connects the connection line L241 and a ground line. One end portion of the connection line L244 is connected to a contact C244 formed between the first switch SW1 and the contact C241 on the connection line L241, and the other end portion of the connection line L244 is connected to a ground line. The connection line L244 is provided with a capacitor CP.

The backup low-voltage power supply 23 is, for example, a secondary battery such as a lithium ion battery. The backup low-voltage power supply 23 outputs electric power having a voltage of, for example, 12 V.

The backup low-voltage power supply 23 is provided on a connection line L213. One end portion of the connection line L213 is connected to the third terminal T243 of the switching device 24, and the other end portion of the connection line L213 is connected to a ground line. The backup low-voltage power supply 23 is provided on the connection line L213 such that a positive electrode side is a third terminal T243 side of the switching device 24 and a negative electrode side is a ground line side.

Therefore, when the second switch SW2 is in the ON state, the backup low-voltage power supply 23 supplies electric power from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. On the other hand, when the second switch SW2 is in the OFF state, the connection line L242 of the switching device 24 is in the cut-off state, and thus electric power is not supplied from the backup low-voltage power supply 23 to the backup power supply system 20.

The backup power supply control device 25 includes a processor such as a central processing unit (CPU). The backup power supply control device 25 further includes a read only memory (ROM), and controls the first switch SW1, the second switch SW2, and the third switch SW3 by software stored in the ROM. Specifically, the backup power supply control device 25 switches the ON state and the OFF state of the first switch SW1, the second switch SW2, and the third switch SW3. The backup power supply control device 25 is connected to the first switch SW1, the second switch SW2, and the third switch SW3 by signal lines. The backup power supply control device 25 transmits operation signals to the first switch SW1, the second switch SW2, and the third switch SW3 via the signal lines. The operation signals include signals for operating the first switch SW1, the second switch SW2, and the third switch SW3 to the ON state and the OFF state.

The backup power supply control device 25 operates by, for example, electric power stored in the backup low-voltage power supply 23

<High-Voltage Power Supply System>

The high-voltage power supply system 30 includes the high-voltage power supply 31 and a high-voyage load 32.

The high-voltage power supply 31 is, for example, a secondary battery such as a lithium ion battery. The high-voltage power supply 31 outputs electric power having a higher voltage than the main low-voltage power supply 11 and the backup low-voltage power supply 23. The high-voltage power supply 31 outputs the electric power having a voltage of, for example, 200 V.

The high-voltage power supply 31 is connected to a connection line L31. One end portion of the connection line L31 is connected to a ground line, and a negative electrode side of the high-voltage power supply 31 is connected to a ground line side of the connection line L31.

The high-voltage load 32 operates with a higher voltage than the normal load 12 and the emergency important load 22. In the present embodiment, the high-voltage load 32 includes the drive unit 321 that drives the vehicle V and an air conditioner 322 that adjusts a temperature inside a vehicle cabin of the vehicle V.

The drive unit 321 includes the rotary electric machine MG that generates power for driving the vehicle V, and a power control unit PCU that controls the rotary electric machine MG. The power control unit PCU includes a DC-DC converter, an inverter, and the like.

The drive unit 321 is connected to the other end portion of the connection line L31. The high-voltage power supply 31 can supply electric power to the drive unit 321. The drive unit 321 converts DC power supplied from the high-voltage power supply 31 into three-phase AC power by the power control unit PCU, and supplies the three-phase AC power to the rotary electric machine MG. Accordingly, the rotary electric machine MG generates power that drives the vehicle V by electric power of the high-voltage power supply 31. The drive unit 321 may generate three-phase AC power by the rotary electric machine MG during braking of the vehicle V, convert the three-phase AC power into DC power by the power control unit PCU, and charge the high-voltage power supply 31 with the DC power.

The air conditioner 322 is connected to a connection line L32 connected to the connection line L31 at a contact C31 formed between the high-voltage power supply 31 on the connection line L31 and the drive unit 321. The air conditioner 322 is operated by the electric power of the high-voltage power supply 31.

<Step-Down Device>

The step-down device 40 is provided on a connection line L40. One end portion of the connection line L40 is connected to a contact C32 formed between the high-voltage power supply 31 and the contact C31 on the connection line L31, and the other end portion of the connection line L40 is connected to a contact C12 formed between the contact C11 on the connection line L10 and the other end portion of the connection line L10 (that is, the first external connection terminal T211 of the backup power supply unit 21 of the backup power supply system 20).

Thus, the high-voltage power supply system 30 is connected to the main power supply system 10 and the backup power supply system 20 via the step-down device 40.

The step-down device 40 steps down the electric power flowing through the high-voltage power supply system 30. The step-down device 40 is, for example, a DC-DC converter. Therefore, a voltage of the electric power flowing through the high-voltage power supply system 30 is stepped down by the step-down device 40, and can be supplied to the main power supply system 10 and the backup power supply system 20.

Further, the step-down device 40 can be switched between a connected state and a cut-off state. When the step-down device 40 is in the connected state, the high-voltage power supply system 30 is connected to the main power supply system 10 and the backup power supply system 20 via the connection line L40 and the step-down device 40. When the step-down device 40 is in the cut-off state, the high-voltage power supply system 30, and the main power supply system 10 and the backup power supply system 20 are cut off.

Therefore, the vehicle power supply system 1 can supply electric power from the high-voltage power supply system 30 to the normal load 12 of the main power supply system 10 and the emergency important load 22 of the backup power supply system 20 via the step-down device 40 even when storage power remaining amounts of the main low-voltage power supply 11 of the main power supply system 10 and the backup low-voltage power supply 23 of the backup power supply system 20 are depleted. Accordingly, the vehicle power supply system 1 can operate the normal load 12 of the main power supply system 10 and the emergency important load 22 of the backup power supply system 20 even when the storage power remaining amounts of the main low-voltage power supply 11 of the main power supply system 10 and the backup low-voltage power supply 23 of the backup power supply system 20 are depleted.

In addition, the vehicle power supply system 1 can charge the main low-voltage power supply 11 of the main power supply system 10 with the electric power of the high-voltage power supply 31 of the high-voltage power supply system 30 via the step-down device 40. Accordingly, it is possible to prevent the storage power remaining amount of the main low-voltage power supply 11 of the main power supply system 10 from being depleted.

In addition, the vehicle power supply system 1 can charge the backup low-voltage power supply 23 of the backup power supply system 20 with the electric power of the high-voltage power supply 31 of the high-voltage power supply system 30 via the step-down device 40. Specifically, by controlling at least one of the first switch SW1 and the third switch SW3 and the second switch SW2 to be in the ON state by the backup power supply control device 25, the electric power of the high-voltage power supply 31 of the high-voltage power supply system 30 can be charged to the backup low-voltage power supply 23 of the backup power supply system 20 via the step-down device 40. Accordingly, it is possible to prevent the storage power remaining amount of the backup low-voltage power supply 23 of the backup power supply system 20 from being depleted.

[Operation of Vehicle Power Supply System]

Next, an operation of the vehicle power supply system 1 will be described with reference to FIGS. 2 to 7.

<Operation of Vehicle Power Supply System when Vehicle Power Supply System Transition from OFF State to ON State>

First, an operation of the vehicle power supply system 1 when the vehicle power supply system 1 transitions from an OFF state to an ON state will be described with reference to FIGS. 2 to 6.

The ON state of the vehicle power supply system 1 refers to a state in which an ON operation is performed on the vehicle power supply system 1, a drive source of the vehicle V is activated, and electric power necessary for driving the vehicle V is supplied to auxiliary machines necessary for traveling, and refers to a state in which the vehicle V is traveling or a state in which the vehicle V can immediately travel. In the present embodiment, the ON state of the vehicle power supply system 1 refers to a state in which the drive unit 321 is activated and the normal load 12 and the emergency important load 22 are activated. The ON operation of the vehicle power supply system 1 refers to, for example, an ON operation of a power switch (not shown) provided in the vehicle V being performed by an operator of the vehicle V In a case in which the vehicle V includes the internal combustion engine, the ON state of the vehicle power supply system 1 may be a state in which the internal combustion engine is activated and the normal load 12 and the emergency important load 22 are activated. In addition, in a case in which the vehicle V includes the internal combustion engine, the ON operation of the vehicle power supply system 1 may be, for example, an ON operation of an ignition power supply switch provided in the vehicle V being performed by the operator of the vehicle V.

On the other hand, the OFF state of the vehicle power supply system 1 refers to a state in which an OFF operation is performed on the vehicle power supply system 1, the drive source of the vehicle V is not activated, and electric power necessary for driving the vehicle V is not supplied to auxiliary machines necessary for traveling. In the present embodiment, the OFF state of the vehicle power supply system 1 refers to a state in which the high-voltage load 32 including the drive unit 321 is not activated, the normal load 12 and the emergency important load 22 are not activated, and standby power is supplied to the normal load 12 and the emergency important load 22. The OFF operation of the vehicle power supply system 1 refers to, for example, an OFF operation of the power switch (not shown) provided in the vehicle V being performed by the operator of the vehicle V. In a case in which the vehicle V includes the internal combustion engine, the OFF state of the vehicle power supply system 1 may be a state in which the internal combustion engine is not activated, the normal load 12 and the emergency important load 22 are not activated, and the standby power is supplied to the normal load 12 and the emergency important load 22. In addition, in a case in which the vehicle V includes the internal combustion engine, the OFF operation of the vehicle power supply system 1 may be, for example, an OFF operation of the ignition power supply switch provided in the vehicle V being performed by the operator of the vehicle V.

An operation of the vehicle power supply system 1 described below is implemented by executing a program stored in advance in the ECU 50 and the backup power supply control device 25 mounted on the vehicle V.

Figure 2:
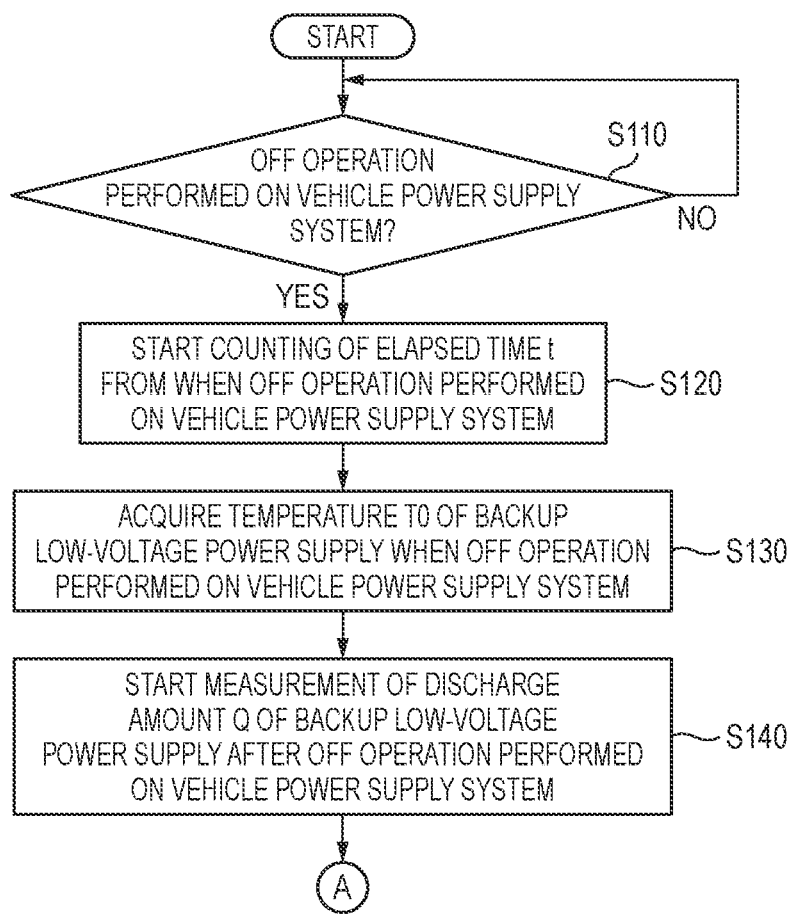
FIG. 2 is a flowchart (part 1) showing an example of an operation of the vehicle power supply system when the vehicle power supply system according to the embodiment of the present invention transitions from an OFF state to an ON state.

As shown in FIG. 2, first, in step S110, it is determined whether the OFF operation is performed on the vehicle power supply system 1. The vehicle power supply system 1 is in a standby state until the OFF operation is performed on the vehicle power supply system 1 (step S110: a loop of NO), and when the OFF operation is performed on the vehicle power supply system 1 (step S110: YES), the processing proceeds to step S120.

In step S120, counting of an elapsed time t from when the OFF operation is performed on the vehicle power supply system 1 is started. Then, the processing proceeds to step S130.

In step S130, a temperature T0 of the backup low-voltage power supply 23 when the OFF operation is performed on the vehicle power supply system 1 is acquired. Then, the processing proceeds to step S140.

In step S140, measurement of a discharge amount Q of the backup low-voltage power supply 23 is started after the OFF operation is performed on the vehicle power supply system 1. Then, the processing proceeds to step S210 (see FIG. 3).

Figure 3:
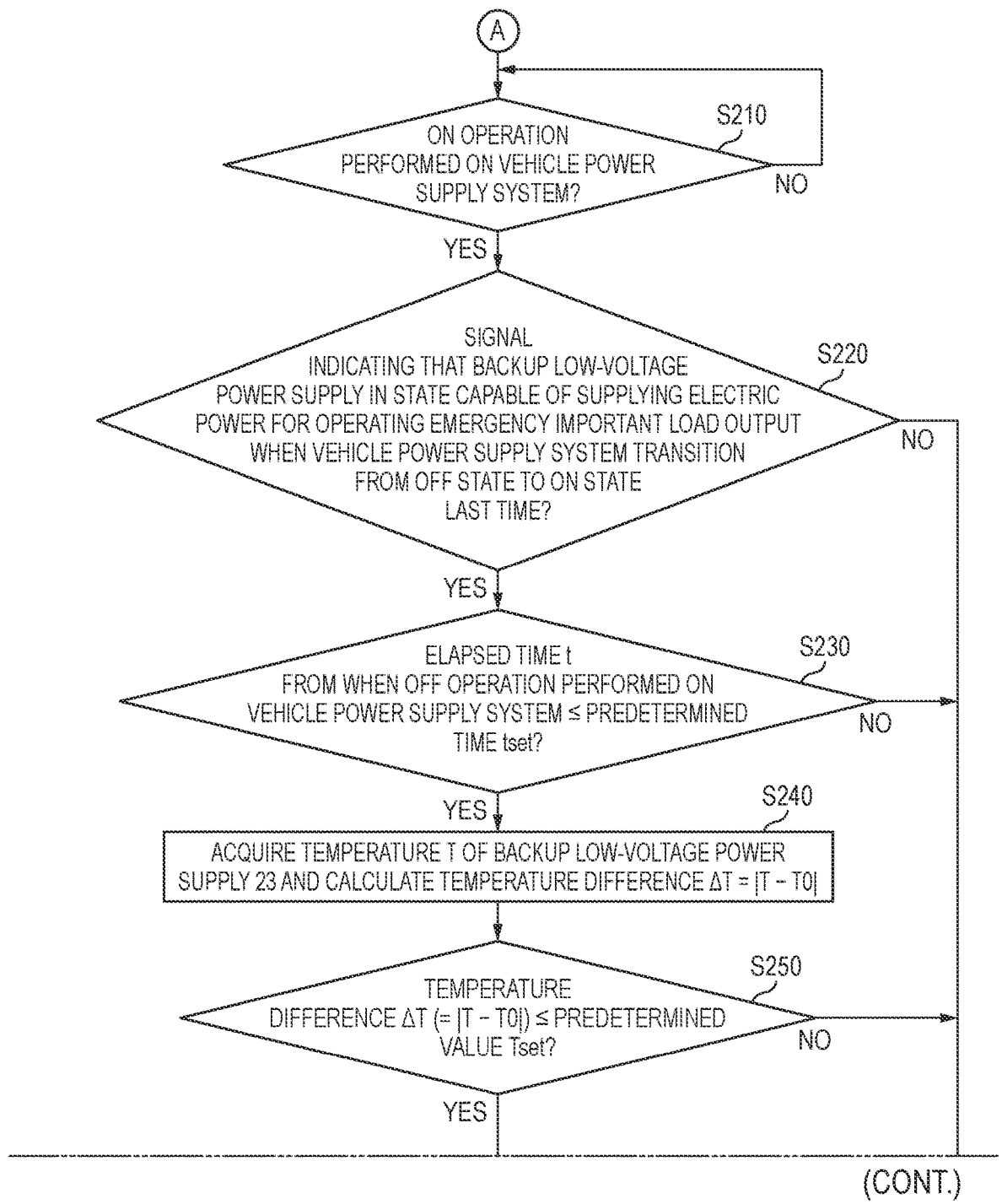
FIG. 3 is a flowchart (part 2) showing an example of the operation of the vehicle power supply system when the vehicle power supply system according to the embodiment of the present invention transitions from the OFF state to the ON state.

As shown in FIG. 3, in step S210, it is determined whether the ON operation is performed on the vehicle power supply system 1. The vehicle power supply system 1 is in a standby state until the ON operation is performed on the vehicle power supply system 1 (step S210: a loop of NO), and when the ON operation is performed on the vehicle power supply system 1 (step S210: YES), the processing proceeds to step S220.

In step S220, it is determined whether a signal indicating that the backup low-voltage power supply 23 is in a state capable of supplying electric power for operating the emergency important load 22 is output from the backup power supply control device 25 when the vehicle power supply system 1 transitions from the OFF state to the ON state last time. When the vehicle power supply system 1 transitions from the OFF state to the ON state last time, if the signal indicating that the backup low-voltage power supply 23 is in a state capable of supplying electric power for operating the emergency important load 22 is output from the backup power supply control device 25 (step S220: YES), the processing proceeds to step S230, and if the signal indicating that the backup low-voltage power supply 23 is in a state capable of supplying electric power for operating the emergency important load 22 is not output from the backup power supply control device 25 (step S220: NO), the processing proceeds to step S300, and the backup power supply control device 25 executes a backup low-voltage power supply state estimation processing to be described later.

In step S230, it is determined whether the elapsed time t from when the OFF operation is performed on the vehicle power supply system 1, the counting of which is started in step S120, is within a predetermined time tset. When the elapsed time t is within the predetermined time tset (step S230: YES), the processing proceeds to step S240. When the elapsed time t is not within the predetermined time tset (step S230: NO), the processing proceeds to step S300, and the backup power supply control device 25 executes the backup low-voltage power supply state estimation processing to be described later.

In step S240, the temperature T of the backup low-voltage power supply 23 is acquired, and a temperature difference $\Delta T=|T-T0|$ is calculated from the acquired temperature 1 of the backup low-voltage power supply 23 and the temperature T0 of the backup low-voltage power supply 23 when the OFF operation is performed on the vehicle power supply system 1 acquired in step S130. Then, the processing proceeds to step S250.

In step S250, it is determined whether the temperature difference $\Delta T(=|-T0)$ acquired in step S240 is equal to or less than a predetermined value Tset. When the temperature difference $\Delta T$ is equal to or less than the predetermined value Tset (step S250: YES), the processing proceeds to step S260. When the temperature difference $\Delta T$ is not equal to or less than the predetermined value Tset (step S250: NO), the processing proceeds to step S300, and the backup low-voltage power supply state estimation processing to be described later is executed.

In step S260, it is determined whether the discharge amount Q of the backup low-voltage power supply 23 after the OFF operation is performed on the vehicle power supply system 1, the measurement of which is started in step S140, is equal to or less than a predetermined value Qset. When the discharge amount Q is equal to or less than the predetermined value Qset (step S260: YES), the processing proceeds to step S421 (see FIG. 4). When the discharge amount Q is not equal to or less than the predetermined value Qset (step S260: NO), the processing proceeds to step S300, and the backup power supply control device 25 executes the backup low-voltage power supply state estimation processing to be described later.

Figure 4:
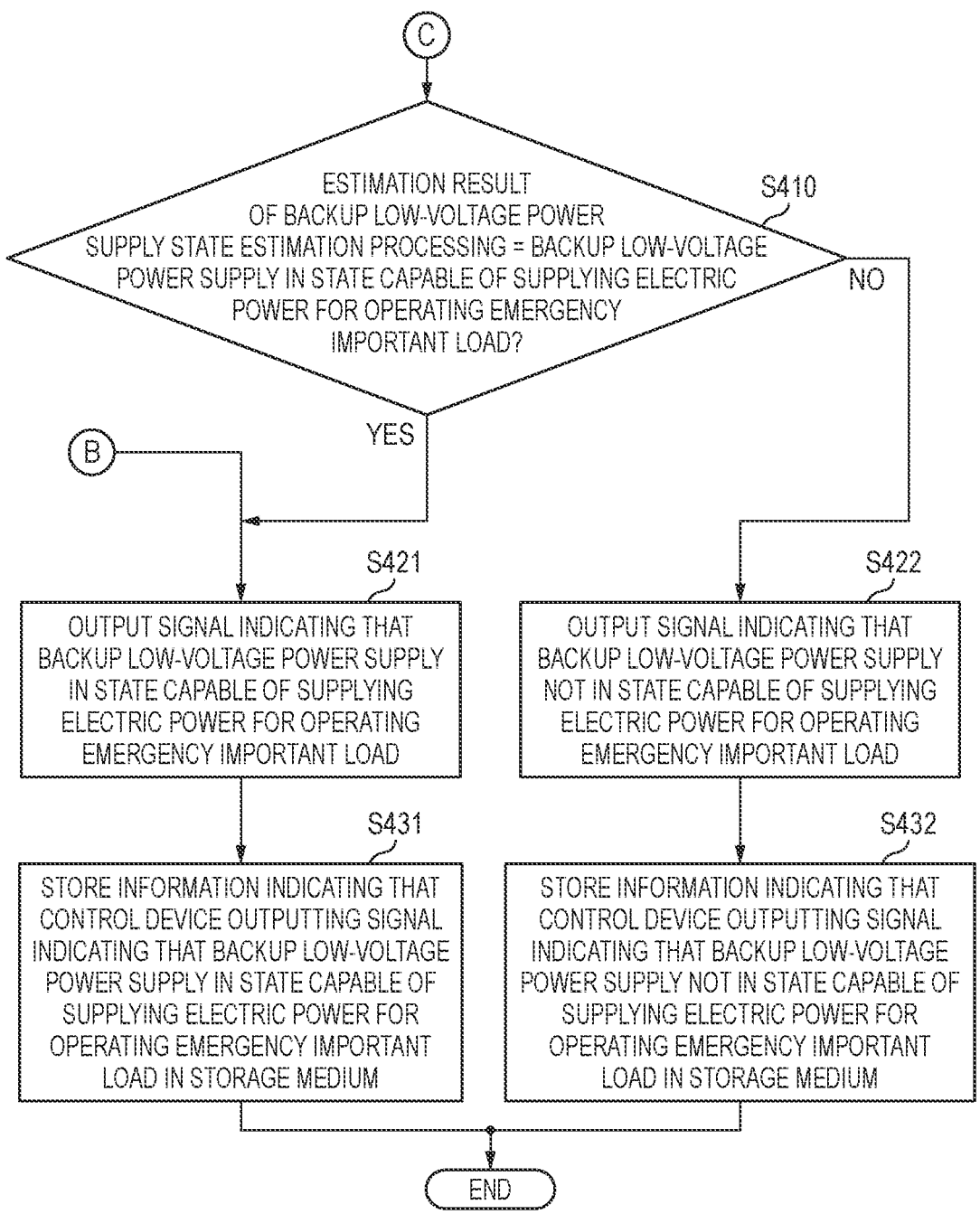
FIG. 4 is a flowchart (part 3) showing an example of the operation of the vehicle power supply system when the vehicle power supply system according to the embodiment of the present invention transitions from the OFF state to the ON state.

As shown in FIG. 4, in step S421, the backup power supply control device 25 outputs a signal indicating that the backup low-voltage power supply 23 is in a state capable of supplying electric power for operating the emergency important load 22. Then, the processing proceeds to step S431, and information indicating that the backup power supply control device 25 outputs the signal indicating that the backup low-voltage power supply 23 is in a state capable of supplying electric power for operating the emergency important load 22 is stored in a storage medium (not shown), and a series of operations of the vehicle power supply system 1 when the vehicle power supply system 1 transitions from the OFF state to the ON state is ended. The storage medium (not shown) may be provided in the ECU 50, may be provided in the backup power supply control device 25, or may be provided separately from the ECU 50 and the backup power supply control device 25.

Next, the backup low-voltage power supply state estimation processing executed in step S300 will be described. The backup power supply control device 25 is capable of executing the backup low-voltage power supply state estimation processing of estimating whether the backup low-voltage power supply 23 is in a state capable of supplying electric power for operating the emergency important load 22.

Then, as described above, when the signal indicating that the backup low-voltage power supply 23 is in a state capable of supplying electric power for operating the emergency important load 22 is not output from the backup power supply control device 25 (step S220: NO), when the elapsed time t from when the OFF operation is performed on the vehicle power supply system 1 is not within the predetermined time tset (step S230: NO), when the temperature difference ΔT=|T−T0| T acquired in step S240 is not equal to or less than the predetermined value Tset (step S250: NO), and when the discharge amount Q of the backup low-voltage power supply 23 after the OFF operation is performed on the vehicle power supply system 1, the measurement of which is started in step S140, is not equal to or less than the predetermined value Qset (step S260: NO), the processing proceeds to step S300, and the backup power supply control device 25 executes the backup low-voltage power supply state estimation processing (see FIG. 3).

Figure 5:
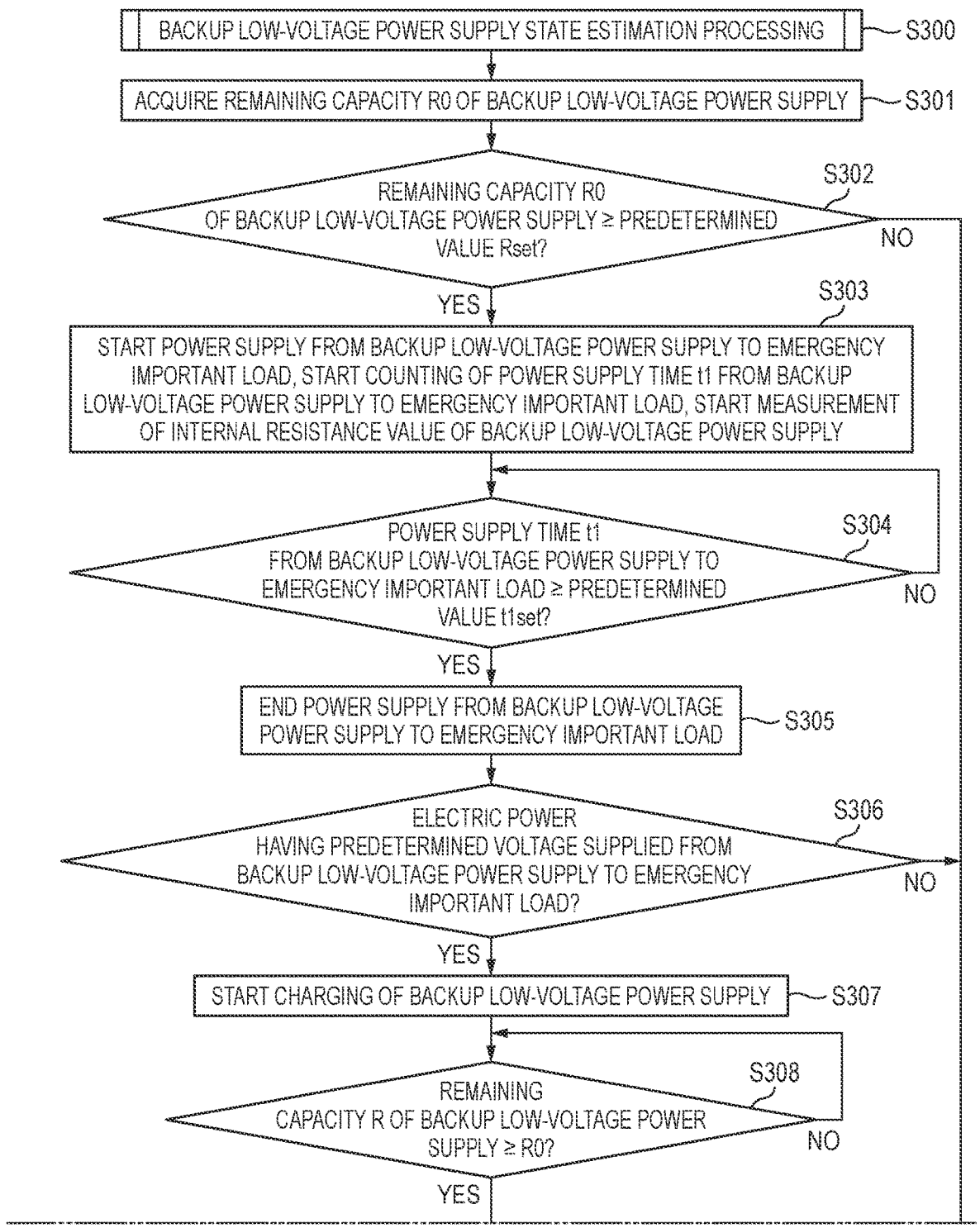
FIG. 5 is a flowchart showing an example of a backup low-voltage power supply state estimation processing in an example of the operation of the vehicle power supply system when the vehicle power supply system transitions from the OFF state to the ON state as shown in FIGS. 2 to 4.

As shown in FIG. 5, the backup low-voltage power supply state estimation processing first proceeds to step S301, acquires a remaining capacity R0 of the backup low-voltage power supply 23, and proceeds to step S302.

In step S302, it is determined whether the remaining capacity R0 of the backup low-voltage power supply 23 acquired in step S301 is equal to or greater than a predetermined value Rset. When the remaining capacity R0 of the backup low-voltage power supply 23 acquired in step S301 is equal to or greater than the predetermined value Rset (step S302: YES), the processing proceeds to step S303. When the remaining capacity R0 of the backup low-voltage power supply 23 acquired in step S301 is not equal to or greater than the predetermined value Rset (step S302: NO), the processing proceeds to step S322, and the backup low-voltage power supply state estimation processing is ended with an estimation result of the backup low-voltage power supply state estimation processing as the backup low-voltage power supply 23 being not in a state capable of supplying electric power for operating the emergency important load 22.

In step S303, power supply from the backup low-voltage power supply 23 to the emergency important load 22 is started, and counting of a power supply time t1 from the backup low-voltage power supply 23 to the emergency important load 22 is started. Further, in step S303, measurement of an internal resistance value of the backup low-voltage power supply 23 is started. Then, the processing proceeds to step S304.

In step S304, it is determined whether a predetermined time t1set elapses from start of the power supply from the backup low-voltage power supply 23 to the emergency important load 22 in step S303, that is, whether the power supply time t1 from the backup low-voltage power supply 23 to the emergency important load 22, the counting of which is started in step S303, is equal to or longer than the predetermined time t1set. The predetermined time t1set is set based on, for example, a total time of a time required to determine whether an abnormality occurs in the main power supply system 10, a time required to execute a driver change request when an abnormality occurs in the main power supply system 10, and a time required to execute the minimal risk maneuver (MRM), which is a minimum necessary traveling operation, stopping operation, and drive control for safely moving the vehicle V to a road shoulder of a road and stopping the vehicle V. The predetermined time is set to, for example, about 20 seconds to 60 seconds. When the power supply time t1 from the backup low-voltage power supply 23 to the emergency important load 22 is not equal to or longer than the predetermined time t1set (step S304: a loop of NO), the standby state is adopted until the power supply time t1 from the backup low-voltage power supply 23 to the emergency important load 22 becomes equal to or longer than the predetermined time t1set, and when the power supply time t1 from the backup low-voltage power supply 23 to the emergency important load 22 becomes equal to or longer than the predetermined time t1set (step S304: YES), the processing proceeds to step S305.

In step S305, the power supply from the backup low-voltage power supply 23 to the emergency important load 22 started in step S303 is ended. Then, the processing proceeds to step S306.

In step S306, it is determined whether electric power having a predetermined voltage is supplied from the backup low-voltage power supply 23 to the emergency important load 22 during a period from step S303 to step S305, that is, during the predetermined time t1 set from the start of the power supply from the backup low-voltage power supply 23 to the emergency important load 22 in step S303. When the electric power having the predetermined voltage is supplied from the backup low-voltage power supply 23 to the emergency important load 22 (step S306: YES), the processing proceeds to step S307. When the electric power having the predetermined voltage is not supplied from the backup low-voltage power supply 23 to the emergency important load 22 (step S306: NO), the processing proceeds to step S322, and the backup low-voltage power supply state estimation processing is ended with an estimation result of the backup low-voltage power supply state estimation processing as the backup low-voltage power supply 23 being not in a state capable of supplying electric power for operating the emergency important load 22. Thus, in the present embodiment, during the predetermined time t1set based on the total time of the time required to determine whether an abnormality occurs in the main power supply system 10, the time required to execute the driver change request when an abnormality occurs in the main power supply system 10, and the time required to execute the minimal risk maneuver (MRM), the electric power is actually supplied from the backup low-voltage power supply 23 to the emergency important load 22 and it is determined whether the electric power having the predetermined voltage is supplied from the backup low-voltage power supply 23 to the emergency important load 22. Accordingly, it is possible to more accurately determine whether the backup low-voltage power supply 23 is capable of continuously supply electric power having a predetermined voltage to the emergency important load 22 until whether an abnormality occurs in the main power supply system 10 is determined when an abnormality occurs in the main power supply system 10, the driver change request is executed when an abnormality occurs in the main power supply system 10, and the minimal risk maneuver (MRM) is completed.

In step S307, charging of the backup low-voltage power supply 23 is started. Electric power charged in the backup low-voltage power supply 23 is supplied from at least one of the high-voltage power supply 31 and the main low-voltage power supply 11. Then, the processing proceeds to step S308.

In step S308, it is determined whether a remaining capacity R of the backup low-voltage power supply 23 is equal to or greater than the remaining capacity R0 of the backup low-voltage power supply 23 acquired in step S301. When the remaining capacity R of the backup low-voltage power supply 23 is not equal to or greater than the remaining capacity R0 of the backup low-voltage power supply 23 acquired in step S301 (step S308: a loop of NO), a standby state is adopted until the remaining capacity R of the backup low-voltage power supply 23 becomes equal to or greater than the remaining capacity R0 of the backup low-voltage power supply 23 acquired in step S301, and when the remaining capacity R of the backup low-voltage power supply 23 becomes equal to or greater than the remaining capacity R0 of the backup low-voltage power supply 23 acquired in step S301 (step S308: YES), the processing proceeds to step S309, the charging of the backup low-voltage power supply 23 is ended, and the measurement of the internal resistance value of the backup low-voltage power supply 23 started in step S303 is ended. Accordingly, during the period from step S303 to step S305, that is, during the predetermined time t1set from the start of the power supply from the backup low-voltage power supply 23 to the emergency important load 22 in step S303, the backup low-voltage power supply 23 can be charged with electric power consumed by the backup low-voltage power supply 23, and the remaining capacity R of the backup low-voltage power supply 23 can be returned to equal to or greater than the remaining capacity R0 of the backup low-voltage power supply 23 at a time when the backup low-voltage power supply state estimation processing in step S300 is started. Then, after step S309, the processing proceeds to step S310.

In step S310, an internal impedance of the backup low-voltage power supply 23 is calculated based on the internal resistance value of the backup low-voltage power supply 23 measured during a period from the start of the power supply from the backup low-voltage power supply 23 to the emergency important load 22 in step S303, through the end of the power supply from the backup low-voltage power supply 23 to the emergency important load 22 in step S305, and the start of the charging of the backup low-voltage power supply 23 in step S307 until the end of the charging of the backup low-voltage power supply 23 in step S309. Then, the processing proceeds to step S311.

In step S311, based on the internal impedance of the backup low-voltage power supply 23 calculated in step S310, it is determined whether the electric power supplied from the backup low-voltage power supply 23 to the emergency important load 22 satisfies a current value required for operating the emergency important load 22 during the period from step S303 to step S305, that is, during the predetermined time t1set from the start of the power supply from the backup low-voltage power supply 23 to the emergency important load 22 in step S303. For example, when the internal impedance of the backup low-voltage power supply 23 is large, even if the electric power having a predetermined voltage is supplied from the backup low-voltage power supply 23 to the emergency important load 22, a current supplied from the backup low-voltage power supply 23 to the emergency important load 22 becomes small, and the current required for operating the emergency important load 22 may not be supplied. In step S311, by determining, based on the internal impedance of the backup low-voltage power supply 23 calculated in step S310, whether the electric power supplied from the backup low-voltage power supply 23 to the emergency important load 22 satisfies the current value required for operating the emergency important load 22 during the period from step S303 to step S305, that is, during the predetermined time t1set from the start of the power supply from the backup low-voltage power supply 23 to the emergency important load 22 in step S303, it is possible to more accurately determine whether the emergency important load 22 can be operated by the electric power supplied from the backup low-voltage power supply 23 to the emergency important load 22 when an abnormality occurs in the main power supply system 10.

In step S311, based on the internal impedance of the backup low-voltage power supply 23 calculated in step S310, when it is determined that a required current is supplied from the backup low-voltage power supply 23 to the emergency important load 22 during the period from step S303 to step S305, that is, during the predetermined time t1set from the start of the power supply from the backup low-voltage power supply 23 to the emergency important load 22 in step S303 (step S311: YES), the processing proceeds to step S321, and the backup low-voltage power supply state estimation processing is ended with an estimation result of the backup low-voltage power supply state estimation processing as the backup low-voltage power supply 23 being in a state capable of supplying electric power for operating the emergency important load 22.

On the other hand, in step S311, based on the internal impedance of the backup low-voltage power supply 23 calculated in step S310, when it is determined that the required current is not supplied from the backup low-voltage power supply 23 to the emergency important load 22 during the period from step S303 to step S305, that is, during the predetermined time t1set from the start of the power supply from the backup low-voltage power supply 23 to the emergency important load 22 in step S303 (step S311: NO), the processing proceeds to step S322, and the backup low-voltage power supply state estimation processing is ended with an estimation result of the backup low-voltage power supply state estimation processing as the backup low-voltage power supply 23 being not in a state capable of supplying electric power for operating the emergency important load 22.

Returning to FIG. 4, when the backup low-voltage power supply state estimation processing of step S300 (see FIG. 3) is ended, the processing proceeds to step S410, and it is determined whether the estimation result of the backup low-voltage power supply state estimation processing of step S300 is an estimation result that the backup low-voltage power supply 23 is in a state capable of supplying electric power for operating the emergency important load 22. When the estimation result of the backup low-voltage power supply state estimation processing of step S300 is the estimation result that the backup low-voltage power supply 23 is in a state capable of supplying electric power for operating the emergency important load 22 (step S410: YES), the processing proceeds to step S421. When the estimation result of the backup low-voltage power supply state estimation processing of step S300 is the estimation result that the backup low-voltage power supply 23 is not in a state capable of supplying electric power for operating the emergency important load 22 (step S410: NO), the processing proceeds to step S422.

In step S421, as described above, the backup power supply control device 25 outputs a signal indicating that the backup low-voltage power supply 23 is in a state capable of supplying electric power for operating the emergency important load 22. Then, the processing proceeds to step S431, and the information indicating that the backup power supply control device 25 outputs the signal indicating that the backup low-voltage power supply 23 is in a state capable of supplying electric power for operating the emergency important load 22 is stored in the storage medium (not shown), and a series of operations of the vehicle power supply system 1 when the vehicle power supply system 1 transitions from the OFF state to the ON state is ended.

On the other hand, in step S422, the backup power supply control device 25 outputs a signal indicating that the backup low-voltage power supply 23 is not in a state capable of supplying electric power for operating the emergency important load 22. Then, the processing proceeds to step S432, and information indicating that the backup power supply control device 25 outputs a signal indicating that the backup low-voltage power supply 23 is not in a state capable of supplying electric power for operating the emergency important load 22 is stored in the storage medium (not shown), and a series of operations of the vehicle power supply system 1 when the vehicle power supply system 1 transitions from the OFF state to the ON state is ended.

In a series of operations of the vehicle power supply system 1 when the vehicle power supply system 1 transitions from the OFF state to the ON state, the backup low-voltage power supply state estimation processing of step S300 and step S410 to step S431 or step S432 are executed by the backup power supply control device 25. In a series of operations of the vehicle power supply system 1 when the vehicle power supply system 1 transitions from the OFF state to the ON state, step S110 to step S140 and step S210 to step S260 may be executed by the ECU 50 or may be executed by the backup power supply control device 25.

A signal indicating that the backup low-voltage power supply 23 is in a state capable of supplying electric power for operating the emergency important load 22 and a signal indicating that the backup low-voltage power supply 23 is not in a state capable of supplying electric power for operating the emergency important load 22, which are output from the backup power supply control device 25 by a series of operations of the vehicle power supply system 1 when the vehicle power supply system 1 transitions from the OFF state to the ON state, are input to the ECU 50. Then, the ECU 50 perform drive control of the vehicle V based on the signal indicating that the backup low-voltage power supply 23 is in a state capable of supplying electric power for operating the emergency important load 22 or the signal indicating that the backup low-voltage power supply 23 is not in a state capable of supplying electric power for operating the emergency important load 22, which is output from the backup power supply control device 25. For example, the ECU 50 determines whether the vehicle V permits autonomous driving based on the signal indicating that the backup low-voltage power supply 23 is in a state capable of supplying electric power for operating the emergency important load 22 or the signal indicating that the backup low-voltage power supply 23 is not in a state capable of supplying electric power for operating the emergency important load 22, which is output from the backup power supply control device 25.

However, in a series of operations of the vehicle power supply system 1 when the vehicle power supply system 1 transitions from the OFF state to the ON state, in the backup low-voltage power supply state estimation processing of step S300, it is necessary to measure the internal resistance value of the backup low-voltage power supply 23 for a predetermined time (for example, about 5 minutes to 10 minutes) in order to calculate the internal impedance of the backup low-voltage power supply 23 with desired accuracy in step S310. Further, the backup low-voltage power supply state estimation processing of step S300 requires the predetermined time t1set during which the power supply is performed from the backup low-voltage power supply 23 to the emergency important load 22 between step S303 and step S305, and a time until the remaining capacity R of the backup low-voltage power supply 23 returns to equal to or greater than the remaining capacity R0 of the backup low-voltage power supply 23 at the time when the backup low-voltage power supply state estimation processing of step S300 is started by charging the backup low-voltage power supply 23 with electric power consumed by the backup low-voltage power supply 23 during the predetermined time t1set from step S303 to step S305. Therefore, the backup low-voltage power supply state estimation processing of step S300 takes a long time from start of the processing to end of the processing. In the backup low-voltage power supply state estimation processing of step S300, it may take about 5 minutes to 10 minutes or more from the start of the processing to the end of the processing.

Therefore, when the backup low-voltage power supply state estimation processing of step S300 is executed, a signal indicating whether the backup low-voltage power supply 23 is in a state capable of supplying electric power for operating the emergency important load 22 is not output from the backup power supply control device 25 during a period from when the ON operation is performed on the vehicle power supply system 1 to when the backup low-voltage power supply state estimation processing of step S300 is completed, for example, during a period from about 5 minutes to 10 minutes or more after the ON operation is performed on the vehicle power supply system 1. Therefore, for example, in a case in which the vehicle V is a vehicle capable of autonomous driving, during a period from when the ON operation is performed on vehicle power supply system 1 to when the backup low-voltage power supply state estimation processing of step S300 is completed, the ECU 50 cannot determine whether the vehicle V is capable of autonomous driving, and the vehicle V cannot execute autonomous driving. Therefore, for example, in a case in which the vehicle V travels on a highway, the OFF operation is performed on the vehicle power supply system 1 in a service area or the like to take a short break, and then the ON operation is performed on the vehicle power supply system 1 to resume traveling on the highway, when the backup low-voltage power supply state estimation processing of step S300 is executed, autonomous driving cannot be executed for, for example, about 5 minutes to 10 minutes after the vehicle V resumes traveling on the highway.

In the present embodiment, in a series of operations of the vehicle power supply system 1 when the vehicle power supply system 1 transitions from the OFF state to the ON state, when a state of the vehicle V satisfies a predetermined condition, the backup power supply control device 25 outputs a signal indicating that the backup low-voltage power supply 23 is in a state capable of supplying electric power for operating the emergency important load 22 without executing the backup low-voltage power supply state estimation processing of step S300, and when the state of the vehicle V does not satisfy the predetermined condition, the backup power supply control device 25 executes the backup low-voltage power supply state estimation processing of step S300, and outputs a signal indicating whether the backup low-voltage power supply 23 is in a state capable of supplying electric power for operating the emergency important load 22 based on an estimation result of the backup low-voltage power supply state estimation processing.

Accordingly, when the state of the vehicle V satisfies the predetermined condition, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state without executing the backup low-voltage power supply state estimation processing of step S300. Therefore, for example, in a case in which the vehicle V is a vehicle capable of autonomous driving, when the state of the vehicle V satisfies the predetermined condition, autonomous driving of the vehicle V can be executed in a short time after the ON operation is performed on the vehicle power supply system 1.

Then, when the backup power supply control device 25 does not execute the backup low-voltage power supply state estimation processing of step S300, the predetermined condition satisfied by the state of the vehicle V includes: outputting a signal indicating that the backup low-voltage power supply 23 is in a state capable of supplying electric power for operating the emergency important load 22 from the backup power supply control device 25 when the vehicle power supply system 1 transitions from the OFF state to the ON state last time (step S220 of FIG. 3: YES); and the elapsed time t after the OFF operation is performed on the vehicle power supply system 1 being within the predetermined time tset (step S230 of FIG. 3: YES).

In a case in which the backup low-voltage power supply 23 is in a state capable of supplying electric power for operating the emergency important load 22 when the vehicle power supply system 1 transitions from the OFF state to the ON state last time, and a time after the OFF operation is performed on the vehicle power supply system 1 is within the predetermined time tset, a probability that the backup low-voltage power supply 23 changes from a state capable of supplying electric power for operating the emergency important load 22 to a state incapable of supplying electric power for operating the emergency important load 22 is low. Therefore, in a case in which a signal indicating that the backup low-voltage power supply 23 is in a state capable of supplying electric power for operating the emergency important load 22 is output from the backup power supply control device 25 when the vehicle power supply system 1 transitions from the OFF state to the ON state last time, and the elapsed time t after the OFF operation is performed on the vehicle power supply system 1 is within the predetermined time tset, there is a high probability that the backup low-voltage power supply 23 is in a state capable of supplying electric power for operating the emergency important load 22.

Therefore, when there is a high probability that the backup low-voltage power supply 23 is in a state capable of supplying electric power for operating the emergency important load 22, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state without executing the backup low-voltage power supply state estimation processing of step S300. Accordingly, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state while preventing a signal indicating that the backup low-voltage power supply 23 is in a state capable of supplying electric power for operating the emergency important load 22 from being output even though the backup low-voltage power supply 23 is not in a state capable of supplying electric power for operating the emergency important load 22.

When the backup power supply control device 25 does not execute the backup low-voltage power supply state estimation processing of step S300, the predetermined condition satisfied by the state of the vehicle V further includes: the temperature difference $\Delta T$ ($=|T-T0|$) between the temperature T of the backup low-voltage power supply 23 and the temperature T0 of the backup low-voltage power supply 23 when the OFF operation is performed on the vehicle power supply system 1 most recently being equal to or less than the predetermined value Tset (step S250 of FIG. 3: YES).

In addition to a case in which a signal indicating that the backup low-voltage power supply 23 is in a state capable of supplying electric power for operating the emergency important load 22 is output from the backup power supply control device 25 when the vehicle power supply system 1 transitions from the OFF state to the ON state last time, and the elapsed time t after the OFF operation is performed on the vehicle power supply system 1 is within the predetermined time tset, further, in a case in which the temperature difference $\Delta T$ ($=|T-T0|$) between the temperature T of the backup low-voltage power supply 23 and the temperature T0 of the backup low-voltage power supply 23 when the OFF operation is performed on the vehicle power supply system 1 most recently is small, there is a high probability that a state of the backup low-voltage power supply 23 does not change greatly after the OFF operation is performed on the vehicle power supply system 1, and therefore, there is a higher probability that the backup low-voltage power supply 23 is in a state capable of supplying electric power for operating the emergency important load 22.

Therefore, when there is a higher probability that the backup low-voltage power supply 23 is in a state capable of supplying electric power for operating the emergency important load 22, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state without executing the backup low-voltage power supply state estimation processing of step S300. Accordingly, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state while further preventing a signal indicating that the backup low-voltage power supply 23 is in a state capable of supplying electric power for operating the emergency important load 22 from being output even though the backup low-voltage power supply 23 is not in a state capable of supplying electric power for operating the emergency important load 22.

When the backup power supply control device 25 does not execute the backup low-voltage power supply state estimation processing of step S300, the predetermined condition satisfied by the state of the vehicle V further includes: the discharge amount Q of the backup low-voltage power supply 23 after the OFF operation is performed on the vehicle power supply system 1 being equal to or less than the predetermined value Qset (step S260: YES).

In addition to a case in which a signal indicating that the backup low-voltage power supply 23 is in a state capable of supplying electric power for operating the emergency important load 22 is output from the backup power supply control device 25 when the vehicle power supply system 1 transitions from the OFF state to the ON state last time, and the elapsed time t after the OFF operation is performed on the vehicle power supply system 1 is within the predetermined time tset, further, in a case in which the discharge amount Q of the backup low-voltage power supply 23 after the OFF operation is performed on the vehicle power supply system 1 is equal to or less than the predetermined value Qset, there is a higher probability that the remaining capacity of the backup low-voltage power supply 23 does not change greatly and the backup low-voltage power supply 23 is in a state capable of supplying electric power for operating the emergency important load 22.

Therefore, when there is a higher probability that the backup low-voltage power supply 23 is in a state capable of supplying electric power for operating the emergency important load 22, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state without executing the backup low-voltage power supply state estimation processing of step S300. Accordingly, the backup power supply control device 25 can output a signal indicating that the backup low-voltage power supply 23 is in a state capable of supplying electric power for operating the emergency important load 22 in a short time after the vehicle power supply system 1 transitions from the OFF state to the ON state while further preventing a signal indicating that the backup low-voltage power supply 23 is in a state capable of supplying electric power for operating the emergency important load 22 from being output even though the backup low-voltage power supply 23 is not in a state capable of supplying electric power for operating the emergency important load 22.

(Modification of Backup Low-Voltage Power Supply State Estimation Processing)

The backup low-voltage power supply state estimation processing may be performed by a flow different from the flow described above with reference to FIG. 5. Here, a modification of the backup low-voltage power supply state estimation processing will be described with reference to FIG. 6.

Figure 6:
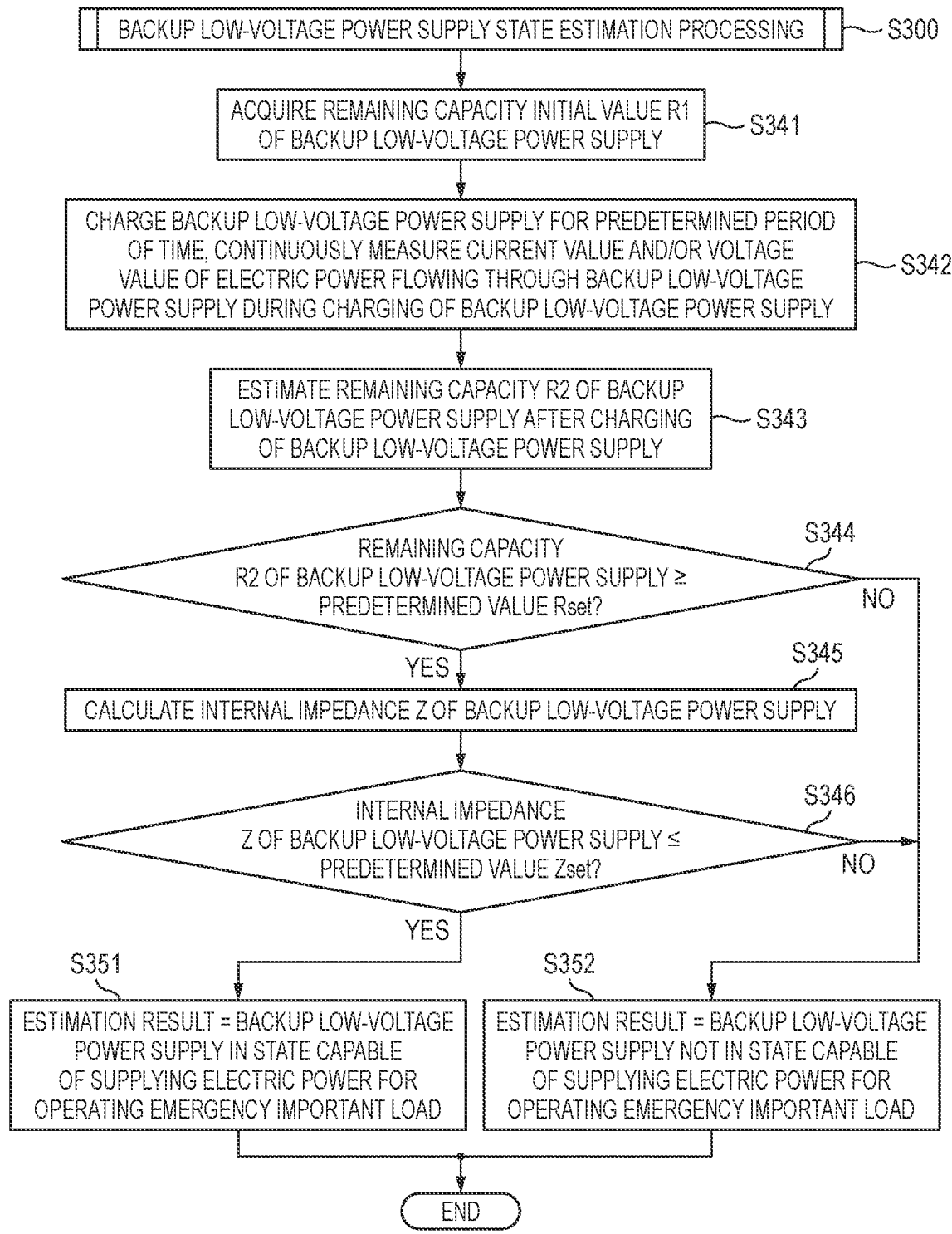
FIG. 6 is a flowchart showing a modification of the backup low-voltage power supply state estimation processing in an example of the operation of the vehicle power supply system when the vehicle power supply system transitions from the OFF state to the ON state as shown in FIGS. 2 to 4.

As shown in FIG. 6, the backup low-voltage power supply state estimation processing first proceeds to step S341, measures an open circuit voltage (OCV) of the backup low-voltage power supply 23, and estimates a remaining capacity initial value R1 of the backup low-voltage power supply 23 based on the measured open circuit voltage of the backup low-voltage power supply 23. Then, the processing proceeds to step S342.

In step S342, the backup low-voltage power supply 23 is charged for a preset predetermined period of time for state management and state estimation of the backup low-voltage power supply 23. Electric power charged in the backup low-voltage power supply 23 is supplied from at least one of the high-voltage power supply 31 and the main low-voltage power supply 11. Further, in step S342, a current value and a voltage value of the electric power flowing through the backup low-voltage power supply 23 are continuously measured for the predetermined period of time during which the backup low-voltage power supply 23 is charged. In step S342, the internal resistance value of the backup low-voltage power supply 23 may be continuously measured for the predetermined period of time during which the backup low-voltage power supply 23 is charged. In step S342, when a predetermined time elapses and the charging of the backup low-voltage power supply 23 is ended, the processing proceeds to step S343.

In step S343, a remaining capacity R2 of the backup low-voltage power supply 23 after the charging of the backup low-voltage power supply 23 in step S342 is estimated. The remaining capacity R2 of the backup low-voltage power supply 23 is estimated from, for example, the current value and the voltage value of the electric power flowing through the backup low-voltage power supply 23 when the backup low-voltage power supply 23 is charged in step S342. Then, the processing proceeds to step S344.

In step S344, it is determined whether the remaining capacity R2 of the backup low-voltage power supply 23 estimated in step S343 is equal to or greater than the predetermined value Rset. When the remaining capacity R2 of the backup low-voltage power supply 23 estimated in step S343 is equal to or greater than the predetermined value Rset (step S344: YES), the processing proceeds to step S345. When the remaining capacity R2 of the backup low-voltage power supply 23 estimated in step S343 is not equal to or greater than the predetermined value Rset (step S344: NO), the processing proceeds to step S352, and the backup low-voltage power supply state estimation processing is ended with an estimation result of the backup low-voltage power supply state estimation processing as the backup low-voltage power supply 23 being not in a state capable of supplying the electric power for operating the emergency important load 22.

In step S345, an internal impedance Z of the backup low-voltage power supply 23 is calculated. The internal impedance Z of the backup low-voltage power supply 23 is calculated, for example, based on behaviors of the current value and the voltage value of the electric power flowing through the backup low-voltage power supply 23 when the backup low-voltage power supply 23 is charged in step S342. The internal impedance Z of the backup low-voltage power supply 23 may be calculated, for example, based on a behavior of the internal resistance value of the backup low-voltage power supply 23 measured during the predetermined period of time during which the backup low-voltage power supply 23 is charged in step S342. Then, the processing proceeds to step S346.

In step S346, it is determined whether the internal impedance Z of the backup low-voltage power supply 23 calculated in step S345 is equal to or less than a predetermined value Zset. When the internal impedance Z of the backup low-voltage power supply 23 calculated in step S345 is equal to or less than the predetermined value Zset (step S345: YES), the processing proceeds to step S351, and the backup low-voltage power supply state estimation processing is ended with an estimation result of the backup low-voltage power supply state estimation processing as the backup low-voltage power supply 23 being in a state capable of supplying electric power for operating the emergency important load 22. On the other hand, when the internal impedance Z of the backup low-voltage power supply 23 calculated in step S345 is not equal to or less than the predetermined value Zset (step S345: NO), the processing proceeds to step S352, and the backup low-voltage power supply state estimation processing is ended with an estimation result of the backup low-voltage power supply state estimation processing as the backup low-voltage power supply 23 being not in a state capable of supplying electric power for operating the emergency important load 22.

[Operation of Vehicle Power Supply System when Vehicle Power Supply System is in ON State]

Next, an operation of the vehicle power supply system 1 when the vehicle power supply system 1 is in the ON state will be described.

(Operation of Vehicle Power Supply System in Normal State when Vehicle Power Supply System is in ON State)

First, an operation of the vehicle power supply system 1 in the normal state when the vehicle power supply system 1 is in the ON state will be described.

When the vehicle power supply system 1 is in the ON state and the vehicle power supply system 1 is in the normal state, the backup power supply control device 25 controls the first switch SW1 to be in the ON state, the second switch SW2 to be in the OFF state, and the third switch SW3 to be in the OFF state. That is, when the vehicle power supply system 1 is in the ON state and the vehicle power supply system 1 is in the normal state, the switching device 24 maintains the first switch SW1 in the ON state, the second switch SW2 in the OFF state, and the third switch SW3 in the OFF state. Accordingly, when the vehicle power supply system 1 is in the ON state and the vehicle power supply system 1 is in the normal state, the normal load 12 and the emergency important load 22 are operated by electric power supplied from the main low-voltage power supply 11.

(Operation of Vehicle Power Supply System when Abnormality Occurs in Main Power Supply System when Vehicle Power Supply System is in ON State)

Next, an operation of the vehicle power supply system 1 when an abnormality occurs in the main power supply system 10 when the vehicle power supply system 1 is in the ON state will be described with reference to FIG. 7.

A voltage sensor (not shown) that detects an output voltage of the main low-voltage power supply 11 is connected to the main low-voltage power supply 11. The voltage sensor outputs a signal indicating the output voltage of the main low-voltage power supply 11. The signal indicating the output voltage of the main low-voltage power supply 11, which is output from the voltage sensor, may be input to the ECU 50 or may be input to the backup power supply control device 25. When the signal indicating the output voltage of the main low-voltage power supply 11 is input to the backup power supply control device 25, the signal indicating the output voltage of the main low-voltage power supply 11 may be input to the backup power supply control device 25 via the ECU 50 or may be directly input from the voltage sensor to the backup power supply control device 25.

Then, the vehicle power supply system 1 can execute an abnormality determination processing of determining whether an abnormality occurs in the main power supply system 10. The abnormality determination processing may be executed by the ECU 50 or may be executed by the backup power supply control device 25. Here, a control flow in a case in which the abnormality determination processing is executed by the backup power supply control device 25 will be described as an example.

Figure 7:
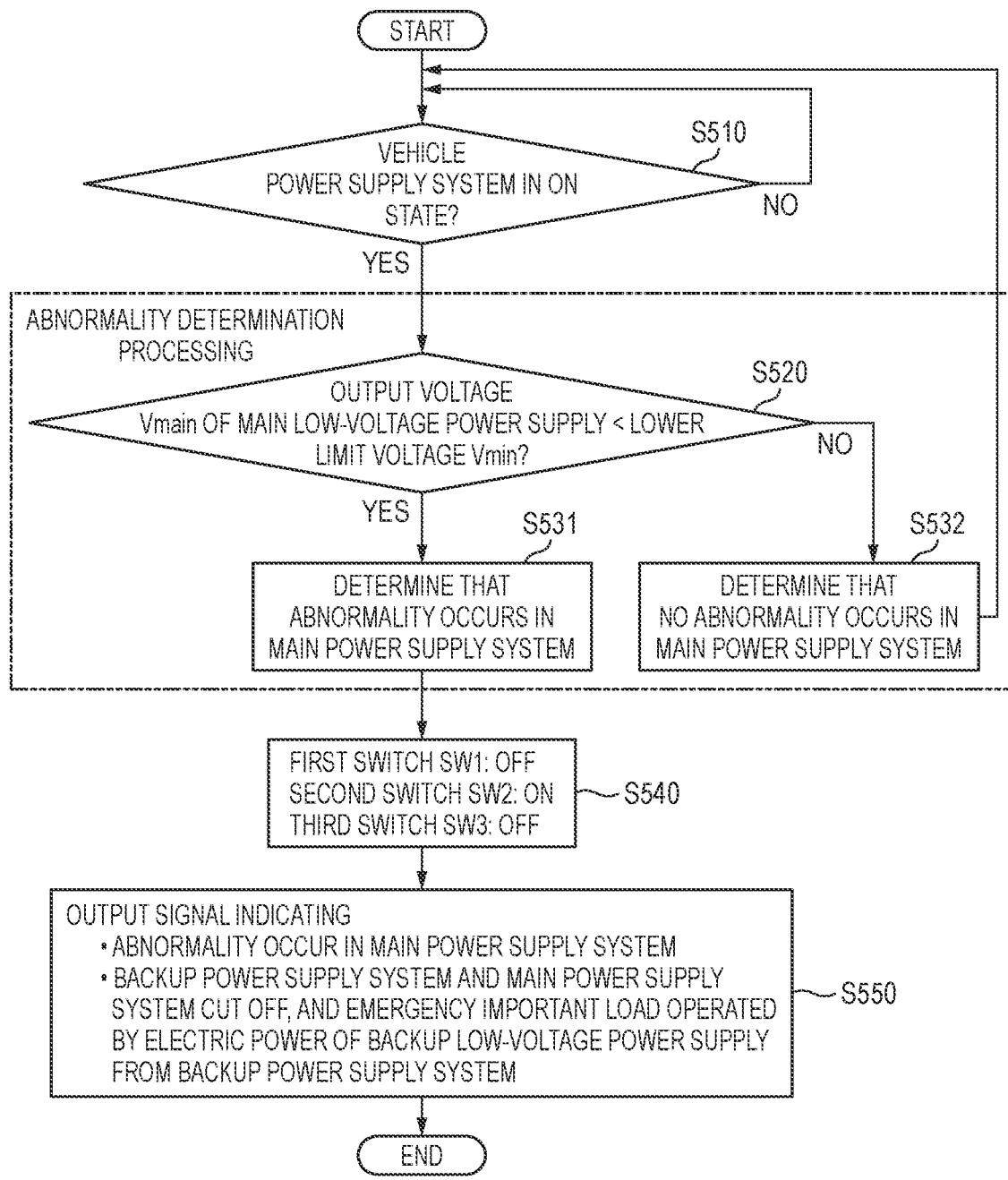
FIG. 7 is a flowchart showing an example of an operation of the vehicle power supply system when an abnormality occurs in a main power supply system when the vehicle power supply system according to the embodiment of the present invention is in the ON state.

As shown in FIG. 7, first, in step S510, it is determined whether the vehicle power supply system 1 is in the ON state. Then, when the vehicle power supply system 1 is in the ON state (step S510: YES), the processing proceeds to step S520, and the abnormality determination processing is executed. On the other hand, when the vehicle power supply system 1 is not in the ON state, that is, when the vehicle power supply system 1 is in the OFF state, the processing does not proceed to the abnormality determination processing, and the vehicle power supply system 1 is in a standby state until the vehicle power supply system 1 is in the ON state (step S510: a loop of NO). Accordingly, when the vehicle power supply system 1 is in the OFF state, electric power consumption of the vehicle power supply system 1 can be reduced without executing the abnormality determination processing.

In step S520, it is determined whether an output voltage Vmain of the main low-voltage power supply 11 is less than a preset lower limit voltage Vmin based on the signal indicating the output voltage of the main low-voltage power supply 11, which is input to the backup power supply control device 25. When the output voltage Vmain of the main low-voltage power supply 11 is not less than the preset lower limit voltage Vmin (step S520: NO), the processing proceeds to step S532, where it is determined that no abnormality occurs in the main power supply system 10, and the processing returns to step S510.

When the output voltage Vmain of the main low-voltage power supply 11 is less than the preset lower limit voltage Vmin (step S520: YES), the processing proceeds to step S531, where it is determined that an abnormality occurs in the main power supply system 10, and the processing proceeds to step S540.

In step S540, the backup power supply control device 25 performs control such that the first switch SW1 is switched to the OFF state, the second switch SW2 is switched to the ON state, and the third switch SW3 is maintained in the OFF state.

Therefore, when the vehicle power supply system 1 is in the ON state, if the abnormality determination processing is executed and it is determined that an abnormality occurs in the main power supply system 10, both the first switch SW1 and the third switch are in the OFF state, and thus the main power supply system 10 and the backup power supply system 20 are cut off. Then, since the second switch SW2 is in the ON state, the electric power of the backup low-voltage power supply 23 is supplied from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. Then, the electric power of the backup low-voltage power supply 23 is supplied to the emergency important load 22 from the connection line L21 through the connection line L241 and the connection line L212.

Then, when step S540 is completed, the processing proceeds to step S550, and the backup power supply control device 25 outputs a signal, which indicates that an abnormality occurs in the main power supply system 10, the backup power supply system 20 and the main power supply system 10 are cut off, and the emergency important load 22 is operated by the electric power of the backup low-voltage power supply 23 from the backup power supply system 20, to the ECU 50. When the signal indicating that an abnormality occurs in the main power supply system 10, the backup power supply system 20 and the main power supply system 10 are cut off, and the emergency important load 22 is operated by the electric power of the backup low-voltage power supply 23 from the backup power supply system 20 is input from the backup power supply system 20, the ECU 50 executes the minimal risk maneuver (MRM), which is a minimum necessary traveling operation, stopping operation, or drive control for safely moving the vehicle V to a road shoulder of a road and stopping the vehicle V.

Accordingly, even if an abnormality occurs in the main power supply system 10 when the vehicle power supply system 1 is in the ON state, the emergency important load 22 can be operated using the electric power of the backup low-voltage power supply 23, so that it is possible to perform the minimal risk maneuver (MRM), which is a minimum necessary traveling operation, stopping operation, or drive control for safely moving the vehicle V to a road shoulder of a road and stopping the vehicle V. Further, when the vehicle power supply system 1 transitions from the OFF state to the ON state, a signal indicating whether the backup low-voltage power supply 23 is in a state capable of supplying electric power for operating the emergency important load 22 is output from the backup power supply control device 25, so that the ECU 50 performs the drive control of the vehicle V based on the signal indicating whether the backup low-voltage power supply 23 is in a state capable of supplying electric power for operating the emergency important load 22, and thus, when an abnormality occurs in the main power supply system 10 when the vehicle power supply system 1 is in the ON state, it is possible to reliably supply electric power for operating the emergency important load 22 from the backup low-voltage power supply 23. For example, the ECU 50 permits autonomous driving of the vehicle V on condition that a signal indicating that the backup low-voltage power supply 23 is in a state capable of supplying electric power for operating the emergency important load 22 is output from the backup power supply control device 25, so that even if an abnormality occurs in the main power supply system 10 during autonomous driving of the vehicle V, the electric power for operating the emergency important load 22 is reliably supplied from the backup low-voltage power supply 23, and it is possible to reliably execute the minimal risk maneuver (MRM), which is a minimum necessary traveling operation, stopping operation, or drive control for safely moving the vehicle V to a road shoulder of a road and stopping the vehicle V.

In addition, when an abnormality occurs in the main power supply system 10 when the vehicle power supply system 1 is in the ON state, the backup power supply system 20 is cut off from the main power supply system 10, and thus the electric power of the backup low-voltage power supply 23 is not supplied to the normal load 12. Accordingly, it is possible to operate the emergency important load 22 while reducing electric power consumption of the backup low-voltage power supply 23.

In addition, while the first switch SW1 and the third switch SW3 are semiconductor switches, the second switch SW2 is a DC-DC converter, so that the time required for the second switch SW2 to switch between the ON state and the OFF state may be longer than the first switch SW1 and the third switch SW3. However, since the switching device 24 includes the capacitor CP as described above, the electric power stored in the capacitor CP is discharged for the time from the completion of the switching of the first switch SW1 to the OFF state to the completion of the switching of the second switch SW2 to the ON state. Therefore, it is possible to supply electric power to the emergency important load 22 also for the time from the completion of the switching of the first switch SW1 to the OFF state to the completion of the switching of the second switch SW2 to the ON state.

Thus, when the vehicle power supply system 1 is in the ON state, the vehicle power supply system 1 executes the abnormality determination processing of determining whether an abnormality occurs in the main power supply system 10. Accordingly, the vehicle power supply system 1 can constantly monitor whether an abnormality occurs in the main power supply system 10 when the vehicle power supply system 1 is in the ON state, so that the switching device 24 can be quickly operated when an abnormality occurs in the main power supply system 10. On the other hand, when the vehicle power supply system 1 transitions from the OFF state to the ON state, the backup power supply control device 25 outputs a signal indicating whether the backup low-voltage power supply 23 is in a state capable of supplying electric power for operating the emergency important load 22. Accordingly, the vehicle power supply system 1 can be operated without constantly monitoring whether the backup low-voltage power supply 23 is in a state capable of supplying electric power for operating the emergency important load 22, so that electric power consumption can be reduced.

Although one embodiment of the present invention has been described above with reference to the accompanying drawings, it goes without saying that the present invention is not limited to such an embodiment. It will be apparent to those skilled in the art that various changes and modifications may be conceived within the scope of the claims. It is also understood that the various changes and modifications belong to the technical scope of the present invention. In addition, constituent elements in the embodiment described above may be combined freely within a range not departing from the spirit of the present invention.

For example, the abnormality determination processing of determining whether an abnormality occurs in the main power supply system 10 shown in the present embodiment is an example, and the abnormality determination processing may determine whether an abnormality occurs in the main power supply system 10 by any device and method. For example, the main power supply system 10 may be provided with a voltage sensor, a current sensor, or the like (not shown), a voltage or a current of the main power supply system 10 may be estimated based on a signal indicating a voltage value or a current value output from the voltage sensor or the current sensor, whether the voltage or the current of the main power supply system 10 is a value within a preset predetermined range may be determined, and a determination may be made that an abnormality occurs in the main power supply system 10 when the voltage or the current of the main power supply system 10 is not a value within the preset predetermined range.

In addition, for example, in the present embodiment, the switching device 24 includes the connection line L243 connected in parallel with the connection line L241, the connection line L241 is provided with the first switch SW1, and the connection line L243 is provided with the third switch SW3, but the switching device 24 may not include the connection line L243, and the connection line L241 may be provided with, instead of the first switch SW1 and the third switch SW3, a changeover switch in which functions of the first switch SW1 and the third switch SW3 of the present embodiment are integrated. Specifically, for example, the changeover switch may be a switch having a normally closed (NC) contact, and when an operation signal is not applied to the changeover switch, the changeover switch may be maintained in the ON state and the connection line L241 may be maintained in the connected state. Further, the changeover switch may be an electromagnetic switch (for example, an electromagnetic contactor or an electromagnetic switch) in which an operation force is an electromagnetic force, and when the electromagnetic force due to an operation current is not generated, the changeover switch may be maintained in the ON state and the connection line L241 may be maintained in the connected state. The changeover switch may be, for example, one semiconductor switch. In the abnormality determination processing, when it is determined that an abnormality occurs in the main power supply system 10, the changeover switch is switched to the OFF state by the backup power supply control device 25.

For example, in the present embodiment, in step S140 (see FIG. 2), the measurement of the discharge amount Q of the backup low-voltage power supply 23 is started after the OFF operation is performed on the vehicle power supply system 1, and in step S260 (see FIG. 3), it is determined whether the discharge amount Q of the backup low-voltage power supply 23 after the OFF operation is performed on the vehicle power supply system 1 is equal to or less than the predetermined value Qset, but step S140 and step S260 may be omitted. Accordingly, when the vehicle power supply system 1 is in the OFF state, it is not necessary to consume electric power necessary for measuring the discharge amount Q of the backup low-voltage power supply 23, so that it is possible to reduce electric power consumption when the vehicle power supply system 1 is in the OFF state.

In addition, for example, in the present embodiment, in step S130 (see FIG. 2), the temperature T0 of the backup low-voltage power supply 23 when the OFF operation is performed on the vehicle power supply system 1 is acquired, in step S240 (see FIG. 3), the temperature T of the backup low-voltage power supply 23 is acquired, and the temperature difference $\Delta T=|T-T0|$ is calculated from the acquired temperature T of the backup low-voltage power supply 23 and the temperature T0 of the backup low-voltage power supply 23 when the OFF operation is performed on the vehicle power supply system 1 acquired in step S130, and in step S250 (see FIG. 3), it is determined whether the temperature difference $\Delta T(=|T-T0|)$ acquired in step S240 is equal to or less than the predetermined value Tset, but step S130, step S240, and step S250 may be omitted. Accordingly, when the vehicle power supply system 1 is in the OFF state, a temperature sensor for measuring the temperature T0 and the temperature T of the backup low-voltage power supply 23 are not required.

In addition, for example, in the present embodiment, the second switch SW2 is a DC-DC converter, but the second switch SW2 may be capable of switching the connection line L242 between the connected state and the cut-off state. Therefore, the second switch SW2 may be any switch capable of switching the connection line L242 between the connected state and the cut-off state, and may be, for example, a semiconductor switch having a normally open (NO) contact or a normally closed (NC) contact.

For example, although the capacitor CP is provided on the connection line L244 in the switching device 24 in the present embodiment, the capacitor CP may not be provided on the connection line L244 in the switching device 24, for example, in a case in which the second switch SW2 can be switched between the ON state and the OFF state in a short time.

At least the following matters are described in the present description. In the parentheses, the corresponding constituent elements and the like in the above embodiment are shown as an example, and the present invention is not limited thereto.

(1) A vehicle power supply system (vehicle power supply system 1) being mounted on a vehicle (vehicle V), the vehicle power supply system including:
  a main power supply system (main power supply system 10) including a main low-voltage power supply (main low-voltage power supply 11) and a normal load (normal load 12); and
  a backup power supply system (backup power supply system 20) including a backup low-voltage power supply (backup low-voltage power supply 23) and an emergency important load (emergency important load 22) and connected to the main power supply system, in which
  the backup power supply system
  is configured to supply electric power of the backup low-voltage power supply to the main power supply system, and
  includes a switching device (switching device 24) configured to switch connection and cut-off with the main power supply system; and
    a backup power supply control device (backup power supply control device 25) that controls the switching device,
  the backup power supply control device
  is configured to execute a backup low-voltage power supply state estimation processing of estimating whether the backup low-voltage power supply is in a state allowing supplying electric power for operating the emergency important load when the vehicle power supply system transitions from an OFF state to an ON state,
  is configured to output a signal indicating whether the backup low-voltage power supply is in a state allowing supplying electric power for operating the emergency important load, in a case in which a state of the vehicle satisfies a predetermined condition, outputs a signal indicating that the backup low-voltage power supply is in a state allowing supplying electric power for operating the emergency important load, without executing the backup low-voltage power supply state estimation processing, and in a case in which the state of the vehicle does not satisfy the predetermined condition, executes the backup low-voltage power supply state estimation processing, and outputs a signal indicating that the backup low-voltage power supply is in a state allowing supplying electric power for operating the emergency important load based on an estimation result of the backup low-voltage power supply state estimation processing.

According to (1), when the state of the vehicle satisfies the predetermined condition, the backup power supply control device outputs the signal indicating that the backup low-voltage power supply is in a state capable of supplying electric power for operating the emergency important load without executing the backup low-voltage power supply state estimation processing, so that the backup power supply control device can output a signal indicating that the backup low-voltage power supply is in a state capable of supplying electric power for operating the emergency important load in a short time after the vehicle power supply system transitions from the OFF state to the ON state.

(2) The vehicle power supply system according to (1), in which the predetermined condition includes:

a signal indicating that the backup low-voltage power supply is in a state allowing supplying electric power for operating the emergency important load being output by the backup power supply control device when the vehicle power supply system transitions from the OFF state to the ON state last time; and an elapsed time (elapsed time t) from when an OFF operation is performed on the vehicle power supply system most recently being within a predetermined time (predetermined time tset).

According to (2), the predetermined condition includes: a signal indicating that the backup low-voltage power supply is in a state capable of supplying electric power for operating the emergency important load being output from the backup power supply control device when the vehicle power supply system transitions from the OFF state to the ON state last time, and the elapsed time other the vehicle power supply system is in the OFF state most recently being within the predetermined time, so that when the state of the vehicle satisfies the predetermined condition, there is a high probability that the backup low-voltage power supply is in a state capable of supplying electric power for operating the emergency important load. Therefore, when there is a high probability that the backup low-voltage power supply is in a state capable of supplying electric power for operating the emergency important load, the backup power supply control device can output a signal indicating that the backup low-voltage power supply is in a state capable of supplying electric power for operating the emergency important load in a short time after the vehicle power supply system transitions from the OFF state to the ON state without executing the backup low-voltage power supply state estimation processing. Accordingly, the backup power supply control device can output a signal indicating that the backup low-voltage power supply is in a state capable of supplying electric power for operating the emergency important load in a short time after the vehicle power supply system transitions from the OFF state to the ON state while preventing a signal indicating that the backup low-voltage power supply is in a state capable of supplying electric power for operating the emergency important load from being output even though the backup low-voltage power supply is not in a state capable of supplying electric power for operating the emergency important load.

(3) The vehicle power supply system according to (2), in which the predetermined condition further includes:

a temperature difference (temperature difference $\Delta T$) between a temperature (temperature T) of the backup low-voltage power supply and a temperature (temperature T0) of the backup low-voltage power supply when the OFF operation is performed on the vehicle power supply system most recently being equal to or less than a predetermined value (predetermined value Tset).

According to (3), the predetermined condition further includes that the temperature difference between the temperature of the backup low-voltage power supply and the temperature of the backup low-voltage power supply when the OFF operation is performed on the vehicle power supply system most recently being equal to or less than the predetermined value, so that when the state of the vehicle satisfies the predetermined condition, there is a higher probability that the state of the backup low-voltage power supply does not change greatly after the OFF operation is performed on the vehicle power supply system and the backup low-voltage power supply is in a state capable of supplying electric power for operating the emergency important load. Accordingly, the backup power supply control device can output a signal indicating that the backup low-voltage power supply is in a state capable of supplying electric power for operating the emergency important load in a short time after the vehicle power supply system transitions from the OFF state to the ON state while further preventing a signal indicating that the backup low-voltage power supply is in a state capable of supplying electric power for operating the emergency important load from being output even though the backup low-voltage power supply is not in a state capable of supplying electric power for operating the emergency important load.

(4) The vehicle power supply system according to (2) or (3), in which the predetermined condition further includes:

a discharge amount (discharge amount Q) of the backup low-voltage power supply after the OFF operation is performed on the vehicle power supply system most recently being equal to or less than a predetermined value (predetermined value Qset).

According to (4), the predetermined condition further includes that the discharge amount of the backup low-voltage power supply after the OFF operation is performed on the vehicle power supply system most recently being equal to or less than the predetermined value, so that there is a higher probability that remaining capacity of the backup low-voltage power supply does not change greatly after the OFF operation is performed on the vehicle power supply system most recently and the backup low-voltage power supply is in a state capable of supplying electric power for operating the emergency important load. Accordingly, the backup power supply control device can output a signal indicating that the backup low-voltage power supply is in a state capable of supplying electric power for operating the emergency important load in a short time after the vehicle power supply system transitions from the OFF state to the ON state while further preventing a signal indicating that the backup low-voltage power supply is in a state capable of supplying electric power for operating the emergency important load from being output even though the backup low-voltage power supply is not in a state capable of supplying electric power for operating the emergency important load.

(5) The vehicle power supply system according to any one of (1) to (4), in which
the backup power supply control device
controls the switching device such that, when an abnormality occurs in the main power supply system, the connection between the backup power supply system and the main power supply system is cut off and electric power of the backup low-voltage power supply is supplied to the emergency important load.

According to (5), when an abnormality occurs in the main power supply system, the backup power supply control device controls the switching device so that the electric power of the backup low-voltage power supply is supplied to the emergency important load, and thus even if an abnormality occurs in the main power supply system when the vehicle power supply system is in the ON state, the emergency important load can be operated using the electric power of the backup low-voltage power supply, so that it is possible to perform the minimal risk maneuver (MRM), which is a minimum necessary traveling operation, stopping operation, or drive control for safely moving the vehicle to a road shoulder of a road and stopping the vehicle. Further, when the vehicle power supply system transitions from the OFF state to the ON state, a signal indicating whether the backup low-voltage power supply is in a state capable of supplying electric power for operating the emergency important load is output from the backup power supply control device, so that the drive control of the vehicle is performed based on the signal indicating whether the backup low-voltage power supply is in a state capable of supplying electric power for operating the emergency important load, and thus, when an abnormality occurs in the main power supply system when the vehicle power supply system is in the ON state, it is possible to reliably supply electric power for operating the emergency important load from the backup low-voltage power supply.

In addition, when an abnormality occurs in the main power supply system when the vehicle power supply system is in the ON state, the backup power supply system is cut off from the main power supply system, and thus the electric power of the backup low-voltage power supply is not supplied to the normal load. Accordingly, it is possible to operate the emergency important load while reducing electric power consumption of the backup low-voltage power supply.

(6) The vehicle power supply system according to any one of (1) to (5), in which
when the vehicle power supply system is in the ON state, the vehicle power supply system executes an abnormality determination processing of determining whether an abnormality occurs in the main power supply system.

According to (6), the vehicle power supply system can constantly monitor whether an abnormality occurs in the main power supply system when the vehicle power supply system is in the ON state, so that the switching device can be quickly operated when an abnormality occurs in the main power supply system. On the other hand, when the vehicle power supply system transitions from the OFF state to the ON state, the backup power supply control device outputs a signal indicating whether the backup low-voltage power supply is in a state capable of supplying electric power for operating the emergency important load. Accordingly, the vehicle power supply system can be operated without constantly monitoring whether the backup low-voltage power supply is in a state capable of supplying electric power for operating the emergency important load, so that electric power consumption can be reduced.

The invention claimed is:

1. A vehicle power supply system being mounted on a vehicle, the vehicle power supply system comprising:
   a main power supply system including a main low-voltage power supply and a normal load; and
   a backup power supply system including a backup low-voltage power supply and an emergency important load and connected to the main power supply system, wherein:
   the backup power supply system is configured to supply electric power of the backup low-voltage power supply to the main power supply system;
   the backup power supply system includes: a switching device configured to switch connection and cut-off with the main power supply system; and a backup power supply control device that controls the switching device;
   the backup power supply control device is configured to:
      execute a backup low-voltage power supply state estimation processing of estimating whether the backup low-voltage power supply is in a state allowing supplying electric power for operating the emergency important load when the vehicle power supply system transitions from an OFF state to an ON state;
      output a signal indicating whether the backup low-voltage power supply is in a state allowing supplying electric power for operating the emergency important load;
      output a signal indicating that the backup low-voltage power supply is in a state allowing supplying electric power for operating the emergency important load, without executing the backup low-voltage power supply state estimation processing, in a case in which a state of the vehicle satisfies a predetermined condition; and
      execute the backup low-voltage power supply state estimation processing, and output a signal indicating that the backup low-voltage power supply is in a state allowing supplying electric power for operating the emergency important load based on an estimation result of the backup low-voltage power supply state estimation processing, in a case in which the state of the vehicle does not satisfy the predetermined condition.

2. The vehicle power supply system according to claim 1, wherein:
   the predetermined condition includes:
      a condition in which a signal, indicating that the backup low-voltage power supply is in a state allowing supplying electric power for operating the emergency important load being output by the backup power supply control device when the vehicle power supply system, transitions from the OFF state to the ON state last time; and
      a condition in which an elapsed time, from when an OFF operation is performed on the vehicle power supply system most recently, is within a predetermined time.

3. The vehicle power supply system according to claim 2, wherein the predetermined condition further includes a condition in which a temperature difference, between a temperature of the backup low-voltage power supply and a temperature of the backup low-voltage power supply when the OFF operation is performed on the vehicle power supply system most recently, is equal to or less than a predetermined value.

4. The vehicle power supply system according to claim 2, wherein
the predetermined condition further includes a condition in which a discharge amount of the backup low-voltage power supply after the OFF operation is performed on the vehicle power supply system most recently is equal to or less than a predetermined value.

5. The vehicle power supply system according to claim 1, wherein
the backup power supply control device controls the switching device to cut off the connection between the backup power supply system and the main power supply system, and to supply electric power of the backup low-voltage power supply to the emergency important load when an abnormality occurs in the main power supply system.

6. The vehicle power supply system according to claim 1, wherein
when the vehicle power supply system is in the ON state, the vehicle power supply system executes an abnormality determination processing of determining whether an abnormality occurs in the main power supply system.

\* \* \* \* \*